(12) United States Patent
Hauser

(10) Patent No.: US 7,624,573 B1
(45) Date of Patent: *Dec. 1, 2009

(54) DRIVE APPARATUS INCLUDING A PUMP ASSEMBLY

(75) Inventor: Raymond Hauser, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/014,843

(22) Filed: Jan. 16, 2008

Related U.S. Application Data

(63) Continuation of application No. 11/622,530, filed on Jan. 12, 2007, now Pat. No. 7,347,047, which is a continuation of application No. 11/073,269, filed on Mar. 3, 2005, now Pat. No. 7,162,870, which is a continuation-in-part of application No. 10/987,681, filed on Nov. 12, 2004, now Pat. No. 7,377,105, and a continuation-in-part of application No. 11/020,699, filed on Dec. 23, 2004, now Pat. No. 7,146,810, said application No. 11/622,530 is a continuation-in-part of application No. 11/609,178, filed on Dec. 11, 2006, now abandoned, which is a continuation of application No. 11/020,669, which is a continuation-in-part of application No. 10/987,681.

(51) Int. Cl.
*F16D 31/02* (2006.01)
(52) U.S. Cl. .......................................... 60/484; 60/486
(58) Field of Classification Search .................. 60/484, 60/485, 486; 92/12.2; 74/11
See application file for complete search history.

(56) References Cited

U.S. PATENT DOCUMENTS

| | | | |
|---|---|---|---|
| 1,539,616 | A | 5/1925 | Williams |
| 2,875,701 | A | 3/1959 | Ebert |
| 2,914,219 | A | 11/1959 | Chiantelassa |
| 3,279,172 | A | 10/1966 | Yoshito Kudo et al. |
| 3,367,105 | A | 2/1968 | Dowty |
| 3,486,335 | A | 12/1969 | Kern et al. |
| 3,643,433 | A | 2/1972 | Widmaier |
| 3,859,790 | A | 1/1975 | Bacquie et al. |
| 3,922,931 | A | 12/1975 | Osujyo et al. |

(Continued)

FOREIGN PATENT DOCUMENTS

EP  1 473 183 A2  11/2004

(Continued)

OTHER PUBLICATIONS

Dixie Chopper, Operation Manual 1998, Cover Page and pp. 50-51, 60-61, 66, Revision #5 Reb. 1998.

*Primary Examiner*—Michael Leslie
(74) *Attorney, Agent, or Firm*—Neal, Gerber & Eisenberg LLP

(57) ABSTRACT

A dual pump apparatus for use on a vehicle or industrial application having a housing in which a pair of hydraulic pumps are mounted and driven by a prime mover. The prime mover is drivingly coupled to a main input shaft, which drives the hydraulic pumps. An auxiliary pump may be drivingly coupled to the main drive shaft and a power take off unit may also be connected thereto. The power take off unit may be driven by a power take off unit output drive shaft, on which a cooling fan may be attached.

26 Claims, 29 Drawing Sheets

U.S. PATENT DOCUMENTS

| | | | |
|---|---|---|---|
| 4,116,292 A | 9/1978 | Todeschini et al. | |
| 4,252,508 A | 2/1981 | Forster | |
| 4,256,439 A | 3/1981 | Kosodo et al. | |
| 4,270,408 A | 6/1981 | Wagner | |
| 4,426,911 A | 1/1984 | Robinson et al. | |
| 4,534,271 A | 8/1985 | Forster | |
| 4,819,508 A | 4/1989 | Yamaoka et al. | |
| 4,893,524 A | 1/1990 | Ohashi et al. | |
| 4,971,535 A | 11/1990 | Okada et al. | |
| 5,040,429 A | 8/1991 | Del Castillo | |
| 5,078,222 A | 1/1992 | Hauser et al. | |
| 5,207,060 A | 5/1993 | Sheets | |
| 5,247,794 A | 9/1993 | Benson et al. | |
| 5,304,043 A | 4/1994 | Shilling | |
| 5,354,180 A | 10/1994 | Forster | |
| 5,392,670 A | 2/1995 | Hauser | |
| 5,501,578 A | 3/1996 | Skirde | |
| 5,542,307 A | 8/1996 | Hasegawa et al. | |
| 5,800,134 A | 9/1998 | Hasegawa et al. | |
| 6,022,198 A | 2/2000 | Hoffmeister | |
| 6,199,380 B1 | 3/2001 | Ishii | |
| 6,267,189 B1 | 7/2001 | Nielsen et al. | |
| 6,301,885 B1 | 10/2001 | Johnson et al. | |
| 6,332,393 B1 | 12/2001 | Trimble | |
| 6,361,282 B1 | 3/2002 | Wanschura | |
| 6,363,815 B1 | 4/2002 | Ishimaru et al. | |
| 6,382,339 B1 | 5/2002 | Nemoto | |
| 6,425,244 B1 | 7/2002 | Ohashi et al. | |
| 6,474,218 B2 | 11/2002 | Saito et al. | |
| 6,487,856 B1 | 12/2002 | Ohashi et al. | |
| 6,494,686 B1 | 12/2002 | Ward | |
| 6,578,656 B2 | 6/2003 | Samejima et al. | |
| 6,672,058 B1 | 1/2004 | Langenfeld et al. | |
| 6,672,843 B1 | 1/2004 | Holder et al. | |
| 6,705,840 B1 | 3/2004 | Hauser et al. | |
| 6,736,605 B2 | 5/2004 | Ohashi et al. | |
| 6,820,403 B2 | 11/2004 | Umemoto | |
| 6,877,302 B2 | 4/2005 | Samejima et al. | |
| 6,953,327 B1 | 10/2005 | Hauser et al. | |
| 6,973,783 B1 | 12/2005 | Hauser et al. | |
| 6,988,580 B2 | 1/2006 | Ohashi et al. | |
| 7,028,472 B2 | 4/2006 | Ohashi et al. | |
| 7,044,259 B2 | 5/2006 | Stoll et al. | |
| 7,146,810 B1 | 12/2006 | Hauser et al. | |
| 7,162,870 B1 * | 1/2007 | Hauser | 60/486 |
| 7,334,404 B2 | 2/2008 | Sakikawa et al. | |
| 7,347,047 B1 * | 3/2008 | Hauser | 60/486 |
| 7,370,714 B2 | 5/2008 | Yasuda et al. | |
| 7,377,105 B1 * | 5/2008 | Hauser | 60/486 |
| 2004/0237490 A1 | 12/2004 | Yasuda et al. | |
| 2005/0016304 A1 | 1/2005 | Ishii et al. | |
| 2006/0272496 A1 | 12/2006 | Ohashi | |

FOREIGN PATENT DOCUMENTS

| | | |
|---|---|---|
| JP | 2000-009023 | 1/2000 |
| JP | 2001-146951 | 5/2001 |
| JP | 2001-263259 | 9/2001 |
| WO | WO 99/67532 | 12/1999 |

\* cited by examiner

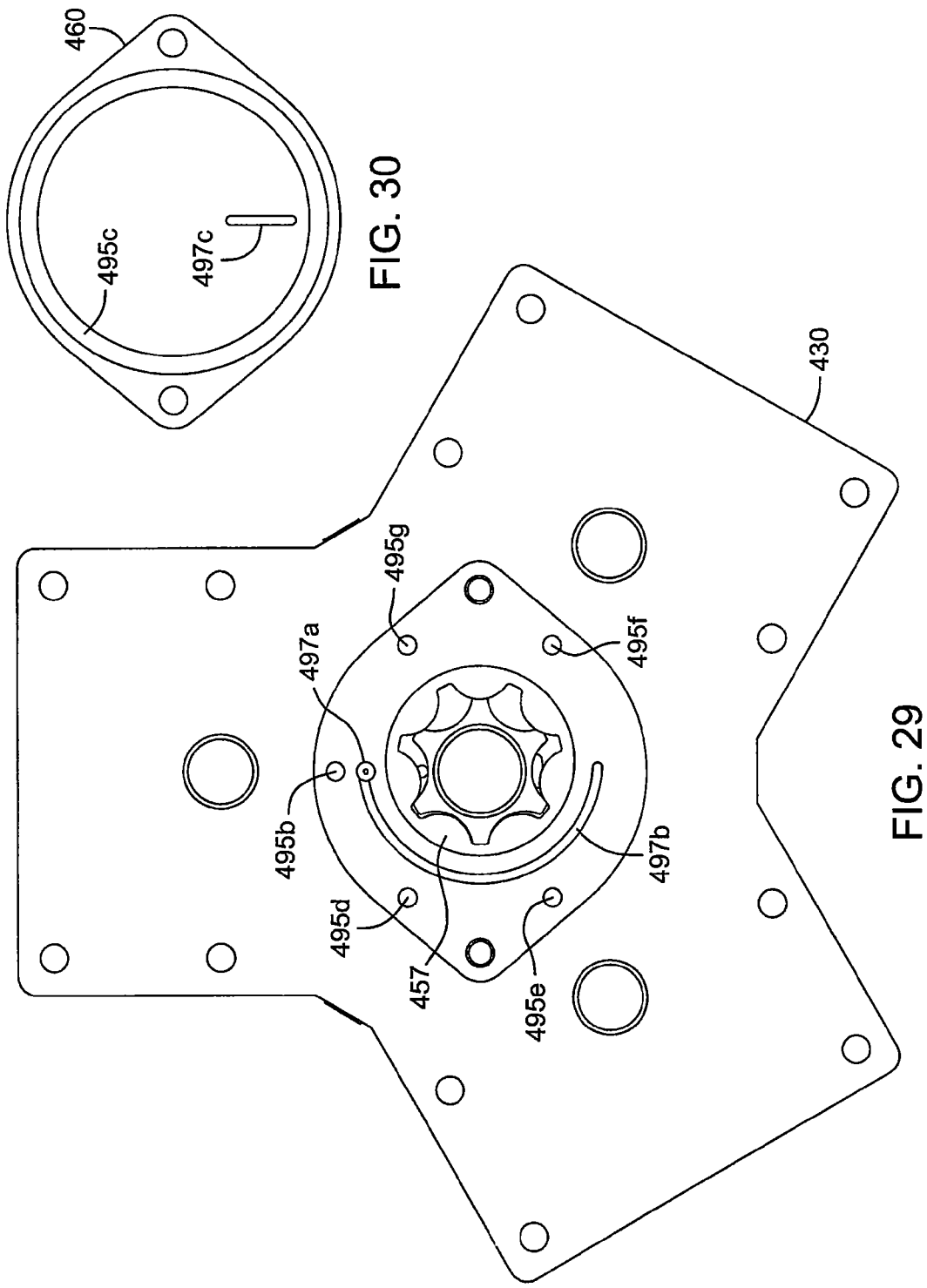

DRIVE APPARATUS INCLUDING A PUMP ASSEMBLY

CROSS REFERENCE TO RELATED APPLICATION

This application is a continuation of U.S. patent Ser. No. 11/622,530 file Jan. 12, 2007; which is a continuation of U.S. patent Ser. No. 11/073,269 filed on Mar. 3, 2005, now U.S. Pat. No. 7,162,870; which is a continuation-in-part of U.S. patent Ser. No. 10/987,681, filed on Nov. 12, 2004, and a continuation-in-part of U.S. patent Ser. No. 11/020,699, filed on Dec. 23, 2004. U.S. patent Ser. No. 11/622,530 is also a continuation-in-part of U.S. patent Ser. No. 11/609,178 filed on Dec. 11, 2006; which is a continuation of U.S. patent Ser. No. 11/020,699 filed on Dec. 23, 2004 now U.S. Pat. No. 7,146,810; which is a continuation-in-part of U.S. patent Ser. No. 10/987,681 filed on Nov. 12, 2004. These prior applications are incorporated herein by reference in their entirety.

BACKGROUND OF THE INVENTION

This application relates in general to hydrostatic pumps and transmissions and in particular to a multi-pump arrangement. Hydrostatic pumps are well-known for use in driving vehicles such as tractors and other off-road devices. Such pumps are also used in a wide variety of industrial applications other than vehicles.

In one known arrangement for a vehicle, a plurality of pumps is mounted in separate housings on a vehicle frame. Each pump is connected to a respective hydrostatic motor through high pressure hoses, which are often connected to the pump through an end cap. The end cap is secured to the pump housing and includes a running surface for the pump cylinder block and porting to connect the cylinder block to the hoses.

A control arm is engaged to each hydrostatic pump to control the output of the pump. In a known design, the hydrostatic pump is of an axial piston design and the control arm is engaged to a swash plate, the rotation of which can change the output of the pump from forward to neutral to reverse. Rotation of the pumps is provided by rotary input shafts which are separately driven by the vehicle engine through pulleys and belts or other known methods. The pump transmits hydraulic fluid through one of a pair of high pressure hoses to a hydrostatic motor. Rotational output of the motor is then transmitted to the vehicle drive wheels through an output axle or other known means.

Such an arrangement allows for zero turn capability, since the hydrostatic pumps may be operated independently of one another. However, there is a cost involved with this arrangement, as it requires at least four separate housings for the individual pumps and motors, and each housing must be individually secured to the vehicle frame.

A BDU transmission, which is a hydrostatic transmission ("HST") that is currently known in the industry, comprises a single housing enclosing both a hydrostatic pump and a hydrostatic motor, both of which are mounted to a single plate. The pump input shaft and motor output shaft are parallel to one another, and the plate contains hydraulic porting to connect the pump and motor. One such hydrostatic transmission is shown in U.S. Pat. No. 5,392,670. Such an HST is generally used to connect to a drive train for powering output axles of a tractor or similar vehicle.

SUMMARY OF THE INVENTION

A multi-pump apparatus for use on a vehicle or industrial application having a housing in which hydraulic pumps are mounted and driven by a prime mover is provided. The prime mover is drivingly coupled to a main input shaft, which drives the hydraulic pumps. An auxiliary pump may be drivingly coupled to the main drive shaft and a power take off unit may also be connected thereto.

A better understanding of the objects, advantages, features, properties and relationships of the invention will be obtained from the following detailed description and accompanying drawings which set forth illustrative embodiments that are indicative of the various ways in which the principles of the invention may be employed.

BRIEF DESCRIPTION OF THE DRAWINGS

FIG. 29 is an end view of the fifth embodiment with the fan, gear chamber cover, and charge cover removed for clarity.

FIG. 30 is an interior view of the charge cover of the fifth embodiment.

DETAILED DESCRIPTION OF THE DRAWINGS

The following is a description of the multiple embodiments of this invention. Where appropriate, like numerals indicate identical or substantially identical components, and similar numerals with a different initial numeral indicate similar components with certain differences as specified. Further, in each of the embodiments discussed herein, identical numerals followed by "a" and "b" identify elements that are either identical or are mirror images of each other. Therefore, for convenience, the descriptions of elements with numerals followed by "a" apply equally to elements with identical numerals followed by "b."

Figure 1:
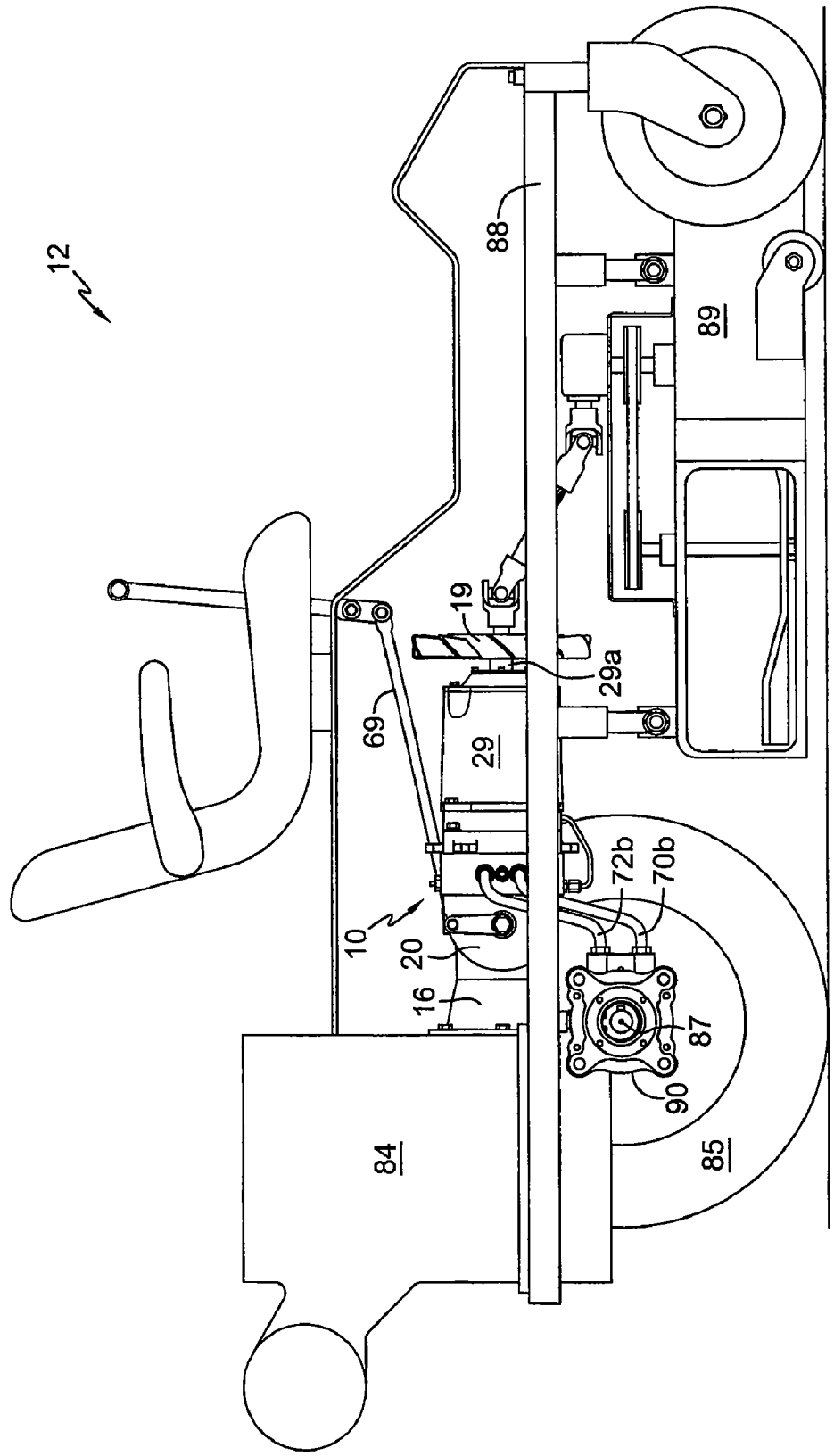
FIG. 1 depicts a vehicle employing a first embodiment of the drive assembly of the present invention with one drive wheel removed for clarity.
Figure 4:
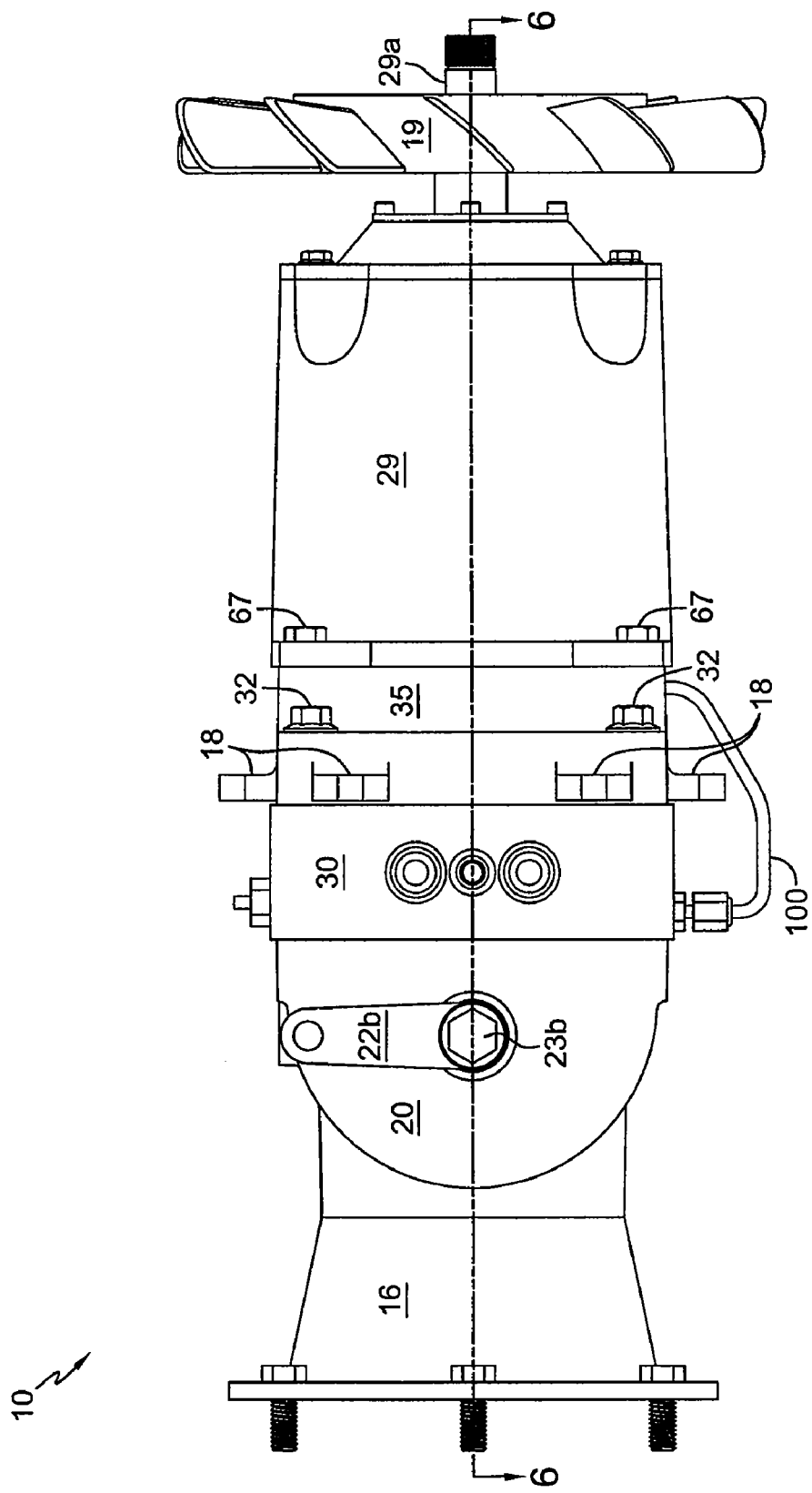
FIG. 4 is a side view of the external casing of a first embodiment of this invention.
Figure 5:
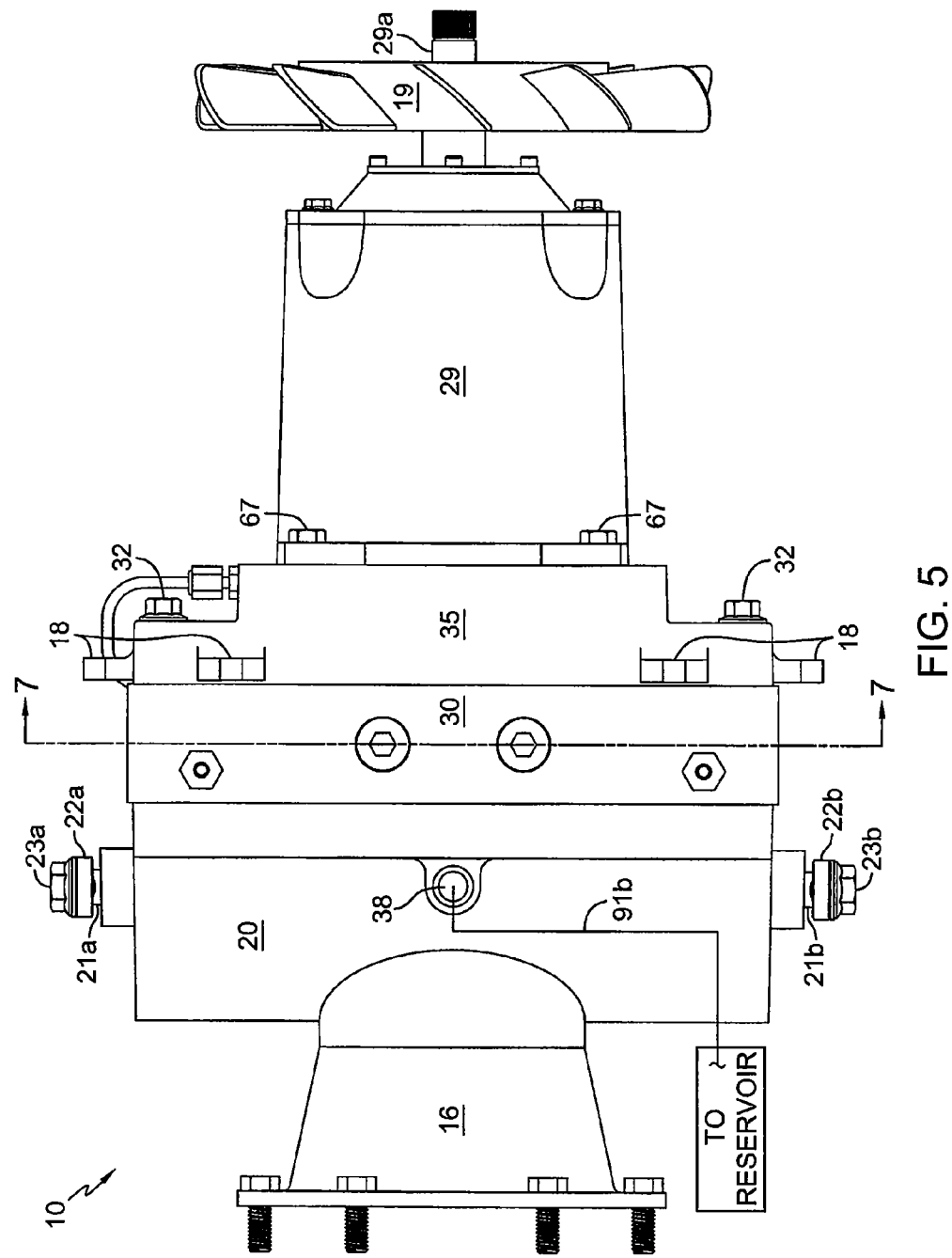
FIG. 5 is a top view of the dual pump design shown in FIG. 4.
Figure 6:
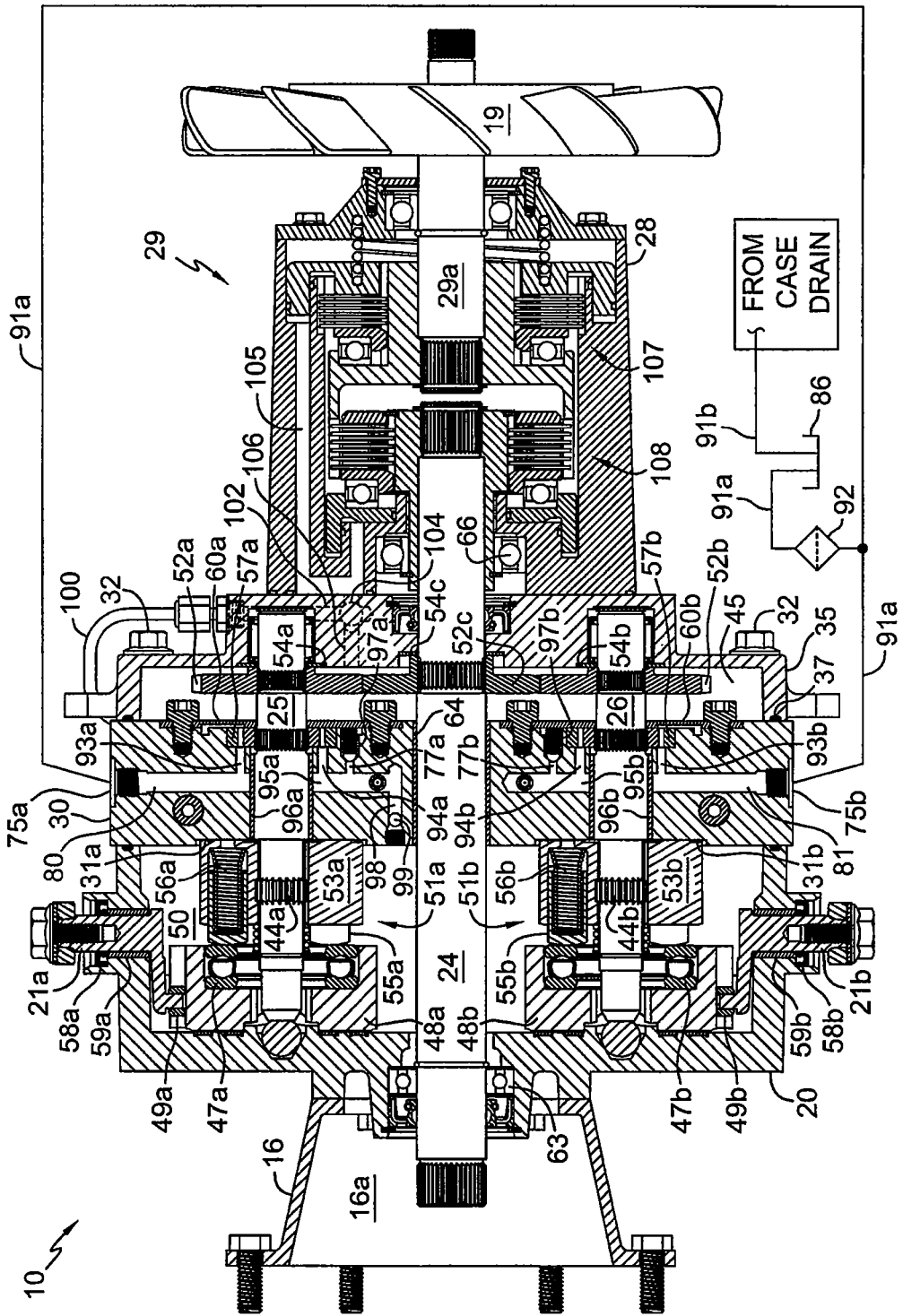
FIG. 6 is a cross-sectional view of the internal components of the dual pump arrangement shown in FIG. 4, along the lines 6-6 in FIG. 4, with certain parts shown as solid, and certain system elements shown schematically.
Figure 7:
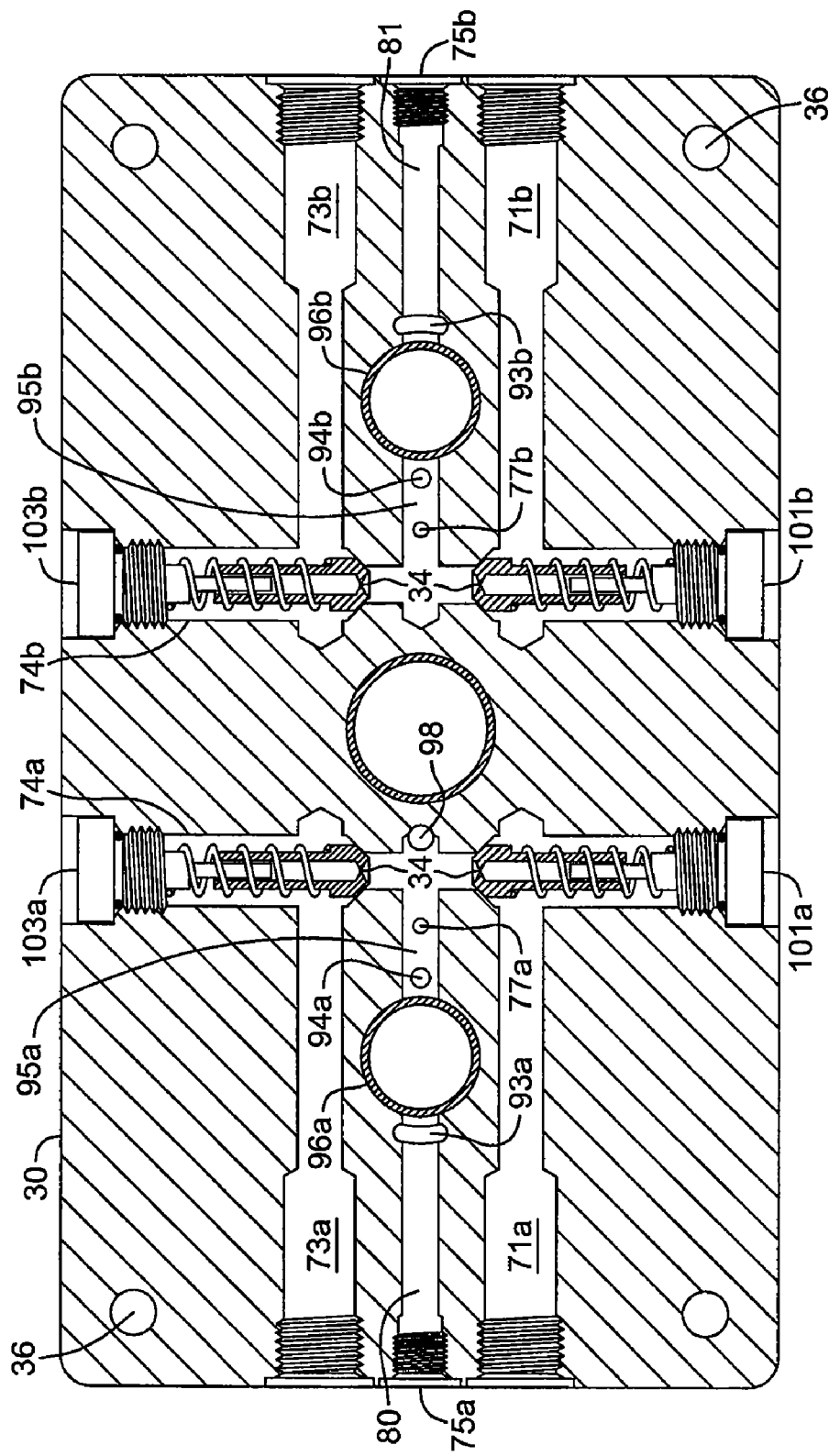
FIG. 7 is a cross-sectional view of the end cap of a first embodiment, along the lines 7-7 in FIG. 5.

A vehicle 12 employing a first embodiment of a dual pump unit 10 is shown in FIG. 1, while the external structure thereof is shown in FIGS. 4 and 5. The internal structure of dual pump unit 10 is shown in FIG. 6. While the hydraulic porting of end cap 30 is shown in FIG. 7, it will be understood that the drawings are not to scale, and the arrangement and sizing of the components will be obvious to a person of skill in the art. The size of pumps 51a and 51b and the other components will be dictated primarily by the intended applications of the unit and any required external dimensions.

FIG. 1 depicts a vehicle 12 incorporating a first embodiment of the present invention. The arrangement shown here is of a rear engine mounting, where engine 84 is mounted on vehicle frame 88, which also supports motors 90, mower deck 89 and other possible attachments. Axles 87 extend from motors 90 and drive vehicle wheels 85.

Pump housing 20 is mounted by way of bell housing 16 to engine 84 so that pump housing 20 is generally parallel to vehicle frame 88 and end cap 30 is perpendicular to vehicle frame 88. Attach points 18 formed on gear chamber cover or casing 35 may also be used to secure pump apparatus 10 to frame 88 in a number of known manners. Hydraulic hoses 70b and 72b carry fluid from threaded system ports 71 and 73 to respective motors 90. Pump apparatus 10 is preferably located along the center line of the vehicle, i.e., along the center of the longitudinal axis of the vehicle parallel to and between members of frame 88. This location of pump apparatus 10 simplifies the arrangement and connections of the various hoses, linkage mechanisms and the like. One such advantage is that hoses 70 and 72 may be generally symmetrical in length and routing. This length symmetry includes having hoses 70 of one generally identical length and hoses 72 of a second generally identical length, or having hoses 70 and 72 being of one generally identical length. Note that while the aforementioned discussion relates to the preferable positioning of pump unit 10 on the vehicle center line, pump unit 10 may be positioned in other locations as need dictates.

Figure 2:
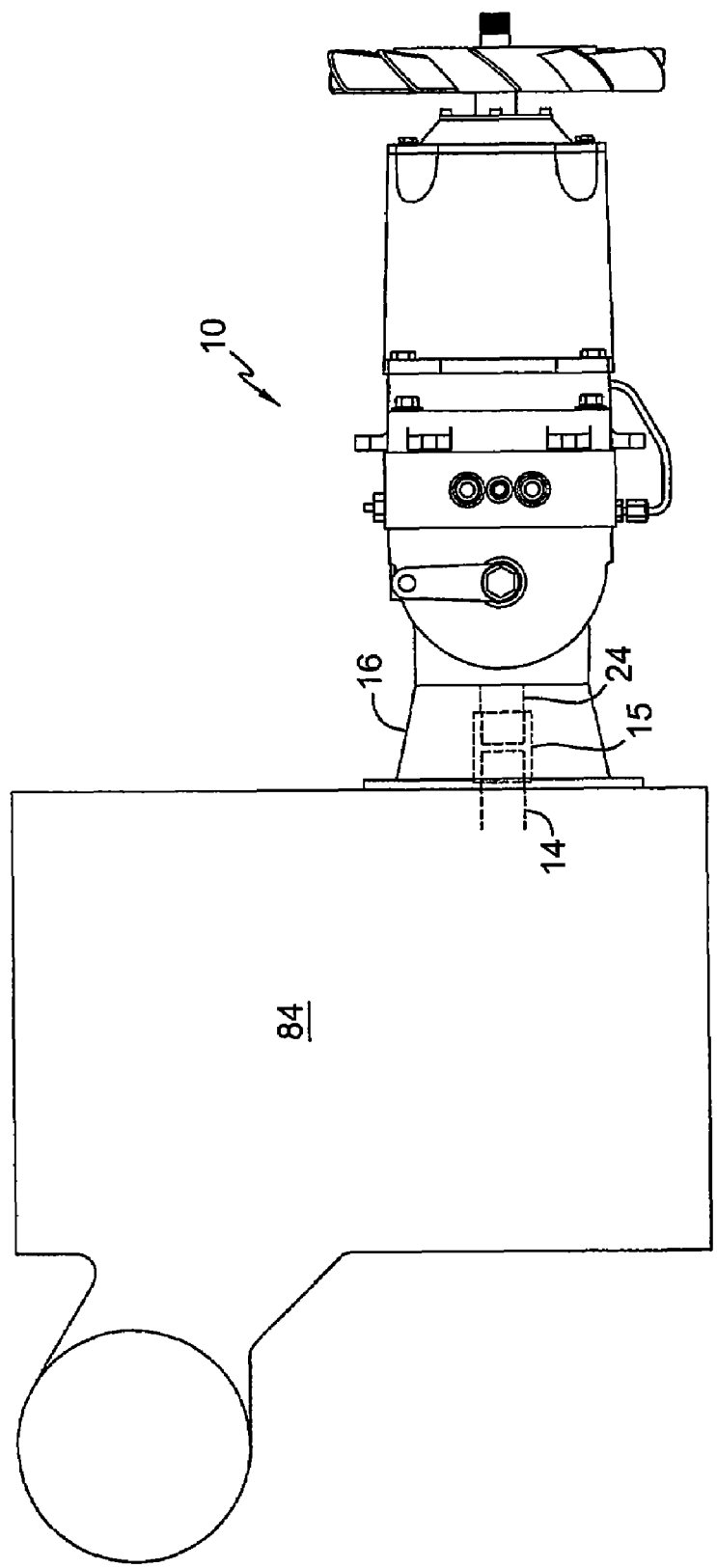
FIG. 2 is a side view of a first embodiment of this invention with certain internal elements shown in phantom to show one type of connection to the prime mover.
Figure 3:
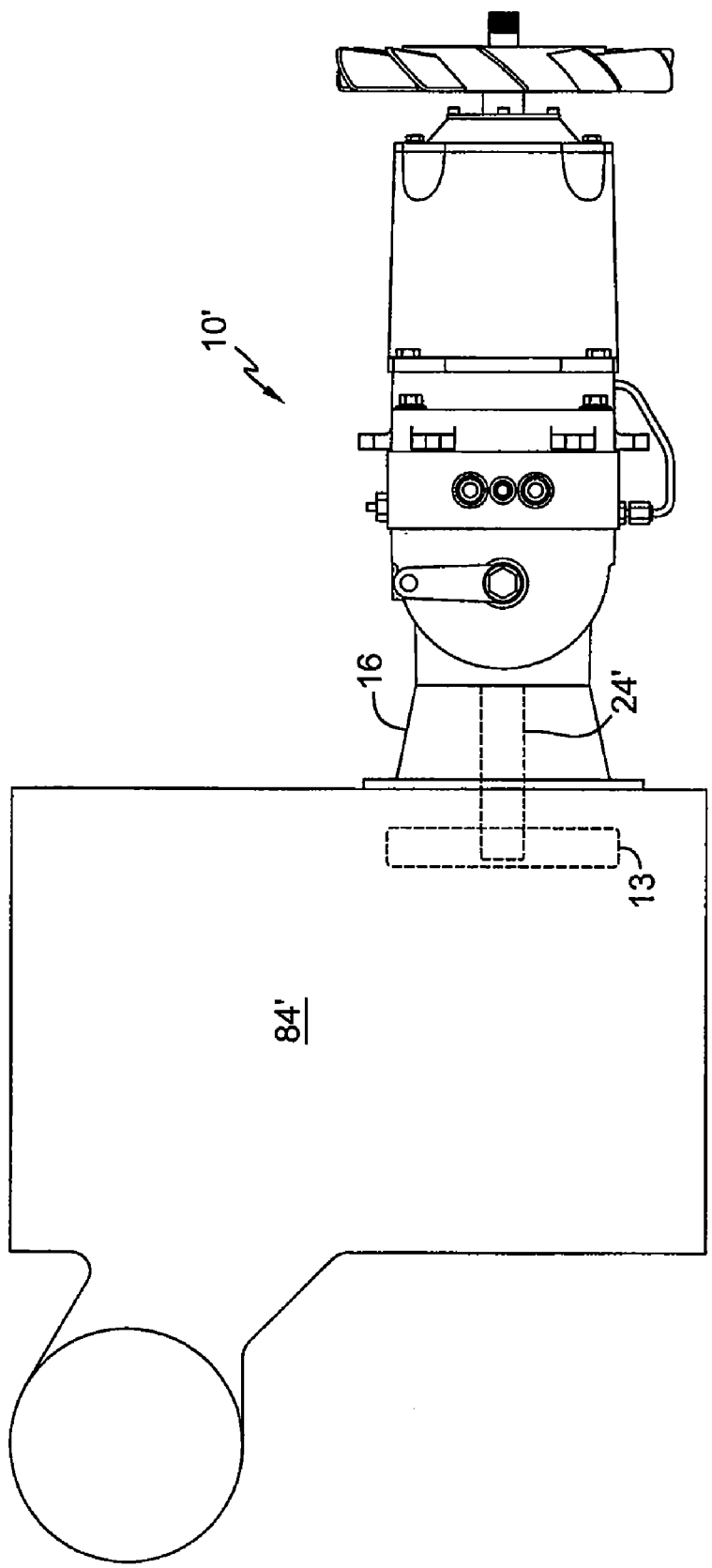
FIG. 3 is a side view of a first embodiment of this invention with certain internal elements shown in phantom to show another type of connection to the prime mover.

Bell housing 16 is positioned between and secured to both pump unit 10 and engine 84. In addition, as shown in FIG. 6, bell housing 16 forms an enclosed space 16a covering the coupling between main drive shaft 24 and engine 84. There are a variety of configurations for connecting main drive shaft 24 to a prime mover 84 output. One such configuration is depicted in FIG. 2, where an engine output shaft 14 is connected to a coaxially positioned main input shaft 24 by coupler 15. Another possible configuration is depicted in FIG. 3, where main input shaft 24' of pump apparatus 10' is connected to flywheel 13 of prime mover 84'.

Inside housing 20 is located a pump chamber (or cavity) 50 in which are mounted a first rotatable pump 51a and a second pump 51b, both of which are rotatably mounted on their respective running surfaces 31a and 31b on end cap 30 which forms a common support structure. End cap 30 is secured to housing 20 by fasteners 32, which also secure gear chamber cover 35 to end cap 30 and which extend through openings 36 in end cap 30 into threaded openings (not shown) in housing 20. End cap 30 acts to close off pump chamber 50.

The following discussion of pump 51a will also apply to second pump 51b. Pump 51a is of the axial piston design and comprises rotatable cylinder block 53a, in which are mounted a plurality of axial stick pistons 55a, each of which includes a piston spring 56a therein, with cylinder block 53a engaged to first pump shaft 25 by means of spline 44a or similar means. Pistons 55a abut a thrust bearing 47a mounted in swash plate 48a. Trunnion arm 21a interfaces with swashplate 48a through slider bearing 49a. Rotation of trunnion arm 21a thus moves swash plate 48a and will control the direction and flow rate of the output of hydraulic pump 51a. End cap 30 is preferably made of aluminum; it should be understood that materials such as cast iron may also be used and a valve plate may be used in conjunction with either material.

Figure 8:
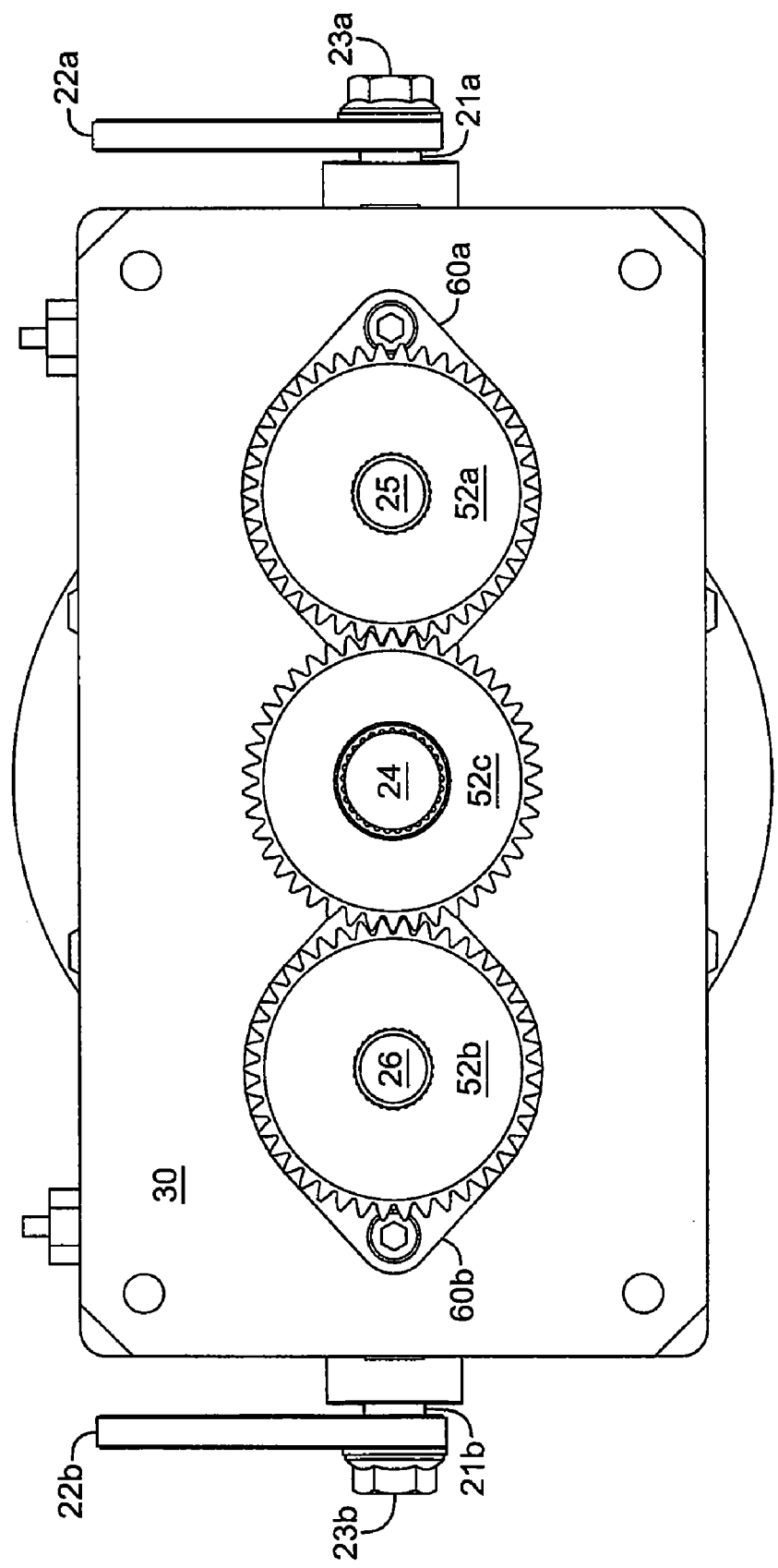
FIG. 8 is an end view of the dual pump design shown in FIG. 5 with the PTO and gear chamber cover removed.

Trunnion arm 21a extends out from housing 20 through seal 58a and bushing 59a. As shown in FIG. 8, control arms 22a and 22b are mounted to trunnion arms 21a and 21b with fasteners 23a and 23b. Control arms 22a and 22b can be engaged to various linkage mechanisms so that pumps 51a and 51b can be independently controlled by a vehicle operator. The location of trunnion arms 21a and 21b on opposite ends of housing 20 (corresponding to the sides of vehicle frame 88) permits the use of more efficient linkage systems 69 which include first and second operating levers.

Main drive shaft 24 is directly engaged to an engine or prime mover 84 on one end and drivingly engaged to pump shafts 25 and 26, as discussed in more detail below and as shown most clearly in FIGS. 2 and 6. For drivingly coupling main drive shaft 24 to pump shafts 25 and 26, a plurality of gear sets may be employed, which will be discussed in greater detail below. In this embodiment, the output of engine 84 is horizontal with respect to the ground, as are main drive shaft 24 and pump shafts 25 and 26.

Drive shaft 24 may also extend outside gear chamber cover 35 and drive a power take off unit or mechanism ("PTO") 29. PTO 29 may assume an engaged and disengaged position. In the engaged position, PTO shaft 29a will be coupled to drive shaft 24 and may be used to power an output device, such as a mower deck. In the disengaged position, PTO shaft 29a and drive shaft 24 will not be in driving communication with one another. PTO shaft 29a extends outside PTO 29 and, as shown in, e.g., FIGS. 1 through 6, a cooling fan 19 may be mounted on PTO shaft 29a. Therefore, when PTO 29 is engaged and drive shaft 24 is coupled to PTO shaft 29a drive shaft 24 will supply the driving force for PTO 29 and fan 19. It should be noted that PTO 29 and the corresponding extension of main drive shaft 24 through gear chamber cover 35 is optional; shaft 24 need not extend out in such a manner, in which case gear chamber cover 35 would be a solid structure on the end thereof.

PTOs are known in the art, so only minimal explanation of the function of PTO 29 will be provided herein. PTO 29 is attached to end cap 30 by a plurality of fasteners 67. Since PTO 29 as depicted is hydraulically controlled, a source of hydraulic fluid is required. In the embodiment shown in FIGS. 6 and 7, charge fluid from passage 94a is directed to charge gallery 95a and then through passage 98 to passage 99, to which is connected hydraulic line 100, shown in FIGS. 4 and 6. Line 100 is connected to passage 102 in gear chamber cover 35. Valve 104, which is operator controlled by one of a variety of known techniques, is used to activate and deactivate PTO 29. Valve 104 either provides pressurized fluid from passage 102 to PTO gallery 105, or it blocks fluid from passage 102 from entering into gallery 105 while relieving pressure from gallery 105. The fluid relieved from gallery 105 travels through passage 106, which is either connected to gear chamber 45 or pump chamber 50 by an internal or external connection.

When valve 104 is operated to provide pressurized fluid from passage 102 to gallery 105, PTO brake 107, which normally clamps PTO shaft 29a to PTO housing 28, is deactivated, thereby leaving PTO shaft 29a free to rotate. As PTO brake 107 is being deactivated, PTO clutch 108 is being activated, connecting main drive shaft 24 to PTO shaft 29a, thus causing PTO shaft 29a to rotate with shaft 24. When valve 104 is returned to a deactivated position pressure is released from gallery 105, allowing clutch 108 to be deactivated and brake 107 to be activated, uncoupling PTO shaft 29a from shaft 24 and braking PTO shaft 29a.

As shown in FIGS. 6 and 8, spur gears 52a, 52b and 52c acting as a first driving mechanism comprising a first gear train, which are preferably helical spur gears, are mounted in gear chamber 45, which may be sealed from pump chamber 50. Spur gear 52c is mounted on main drive shaft 24 and is directly engaged to spur gears 52a and 52b, which are mounted on shaft 25 and shaft 26, respectively. Gears 52a, 52b, and 52c are positioned by shoulders formed on their respective shafts and by proximity to washers 54a, 54b and 54c, which are located adjacent gear chamber cover 35. Shafts 25 and 26 in turn drive first and second pumps 51a and 51b, respectively.

Gear chamber 45 is formed by end cap 30 and gear chamber cover 35, which is secured to housing 20 through end cap 30 by a plurality of fasteners 32, as previously noted. A sealant, gasket, or o-ring 37 may be used at this junction to prevent leakage of hydraulic oil or gear grease. Main drive shaft 24 may be supported and located in a variety of locations, such as PTO 29 by sealed bearing 66, housing 20 by bearing 63, end cap 30 by bearing 64, or in gear chamber cover 35. Cooling fan 19 is secured to main drive shaft 24 by a spline and retaining ring (not shown) or may be secured by a number of other known configurations. An optional oil cooler (not shown) could also be added to the system and located to take advantage of the air flow from cooling fan 19. A seal may be positioned adjacent main drive shaft 24 between pump chamber 50 and gear chamber 45 so that different lubricants may be used in each chamber, such as oil in pump chamber 50 and grease in gear chamber 45.

As shown most clearly in FIG. 6, charge pumps 57a and 57b, which are gerotor style charge pumps, are mounted in end cap 30 and splined to pump shafts 25 and 26. Charge pumps 57a and 57b may be secured in end cap 30 by charge covers 60a and 60b. Kidney 93a provides oil from passage 80 to charge pump 57a. As shown in FIGS. 6 and 7, pressurized oil is sent from charge pump 57a to charge gallery 95a through passage 94a. Charge relief opening 77a is also formed in charge gallery 95a to permit oil to be discharged therethrough by means of charge relief valve 97a in the event of excess oil pressure.

The hydraulic porting in end cap 30 is shown in FIG. 7. System ports 71 and 73 extend into end cap 30, with ports 71a and 73a in communication with first pump 51a and ports 71b and 73b in communication with second pump 51b. A set of check valves 101a, 101b, 103a and 103b is threaded into respective openings 74a and 74b in end cap 30, corresponding to ports 71a, 71b, 73a and 73b. Check valves 101a, 101b, 103a and 103b are of a standard design known in the art, and each may include a bleed 34 formed in the end thereof. Check valves 101a and 103a are in communication with pump 51a, while check valves 101b and 103b are in communication with pump 51b.

When swash plate 48a is in the forward position, one of ports 71a or 73a will be under high pressure and the other port will be under low pressure, or vacuum. When swash plate 48a is moved to the neutral position, neither port will be under pressure, and when the direction of swash plate 48a changes (e.g., from forward to reverse) the status of ports 71a and 73a will switch, with the formerly low pressure or vacuum side being placed under high pressure, and vice versa. The ends of each system ports 71a, 71b, 73a, and 73b are threaded to permit connection of hoses 70 and 72 and the like.

As shown in FIG. 6, an external oil reservoir 86 may be mounted at various locations on vehicle 12 or on pump apparatus 10. Oil drains from pump chamber 50 through case drain 38, and then through outlet hose 91b to reservoir 86. Oil returns to the system through inlet hose 91a, passing through filter 92 into charge pump inlets 75a and 75b. As shown in FIG. 5, case drain 38 is located in housing 20 in a location corresponding to pump chamber 50, so that oil will drain from chamber 50 to reservoir 86 and will be passed through filter 92 before its return to the system. Filter 92 could also be located on hose 91b. Referring to FIG. 7, passages 80 and 81 are formed in end cap 30 and connected to charge inlets 75a and 75b. The location of passages 80 and 81 between system ports 71a and 73a allows for a compact end cap 30.

Bearing 96a, which is preferably a standard friction bearing, is used not only to support input shaft 25 but also to divide passage 80 into two separate sides, where inlet 75a and kidney 93a, which supplies oil from reservoir 86 to charge pump 57a, are on one side thereof, and passage 94a, which provides pressurized oil from charge pump 57a to charge gallery 95a, is on the other side. A similar bearing 96b is also used to support second shaft 26.

As noted above, pump chamber 50 and gear chamber 45 can be strictly segregated, such that the hydraulic oil used in pumps 51a and 51b is independent of the lubricant for spur gears 52a, 52b and 52c. This segregation would permit the use of a gear lubricant in gear chamber 45, which may be desirable in certain applications. It should be obvious to those with skill in the art that the foregoing arrangement may be varied without departing from the scope of the present invention.

Figure 9:
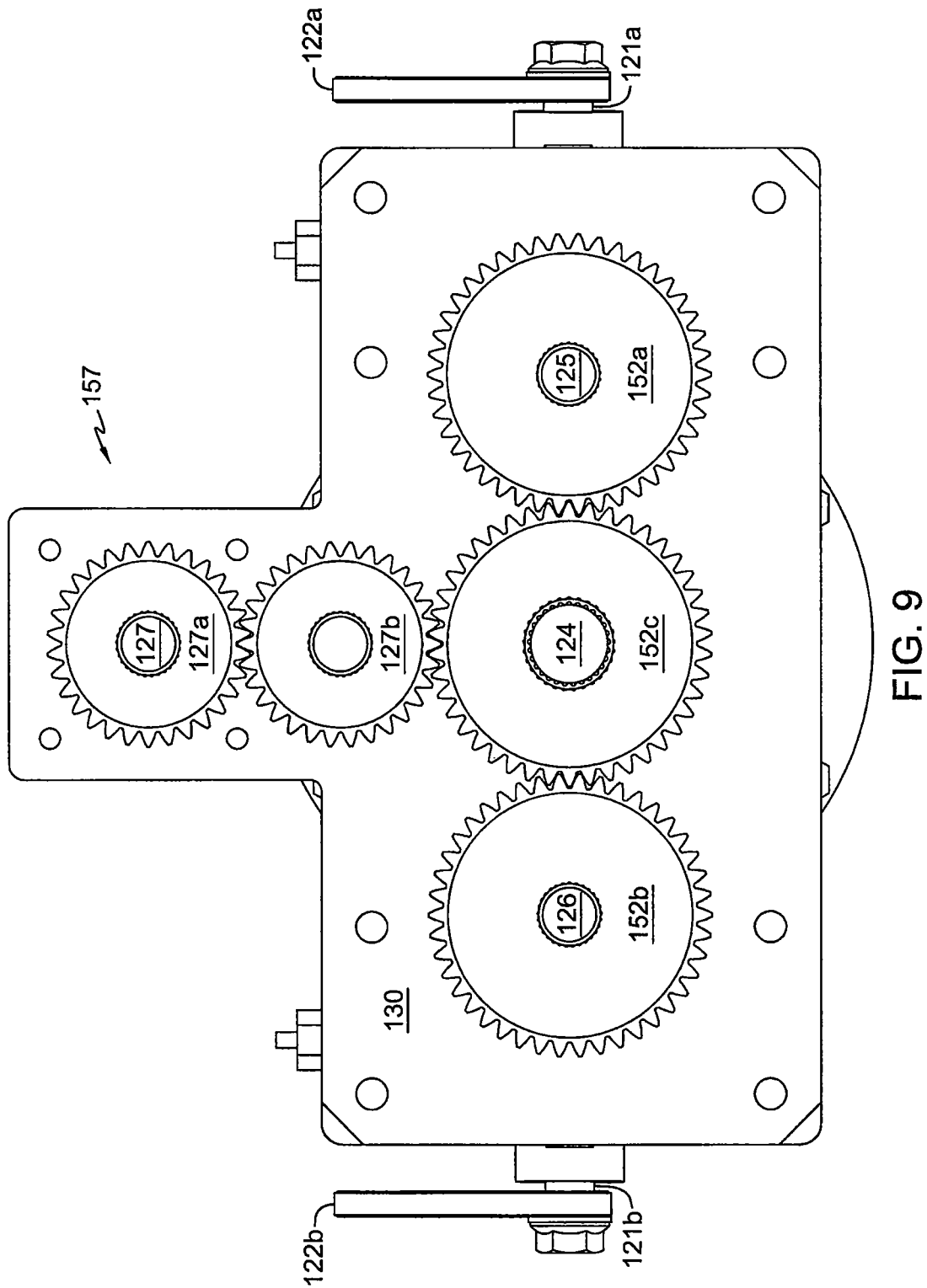
FIG. 9 is an end view of a second embodiment of this invention with the PTO and gear chamber cover removed.
Figure 10:
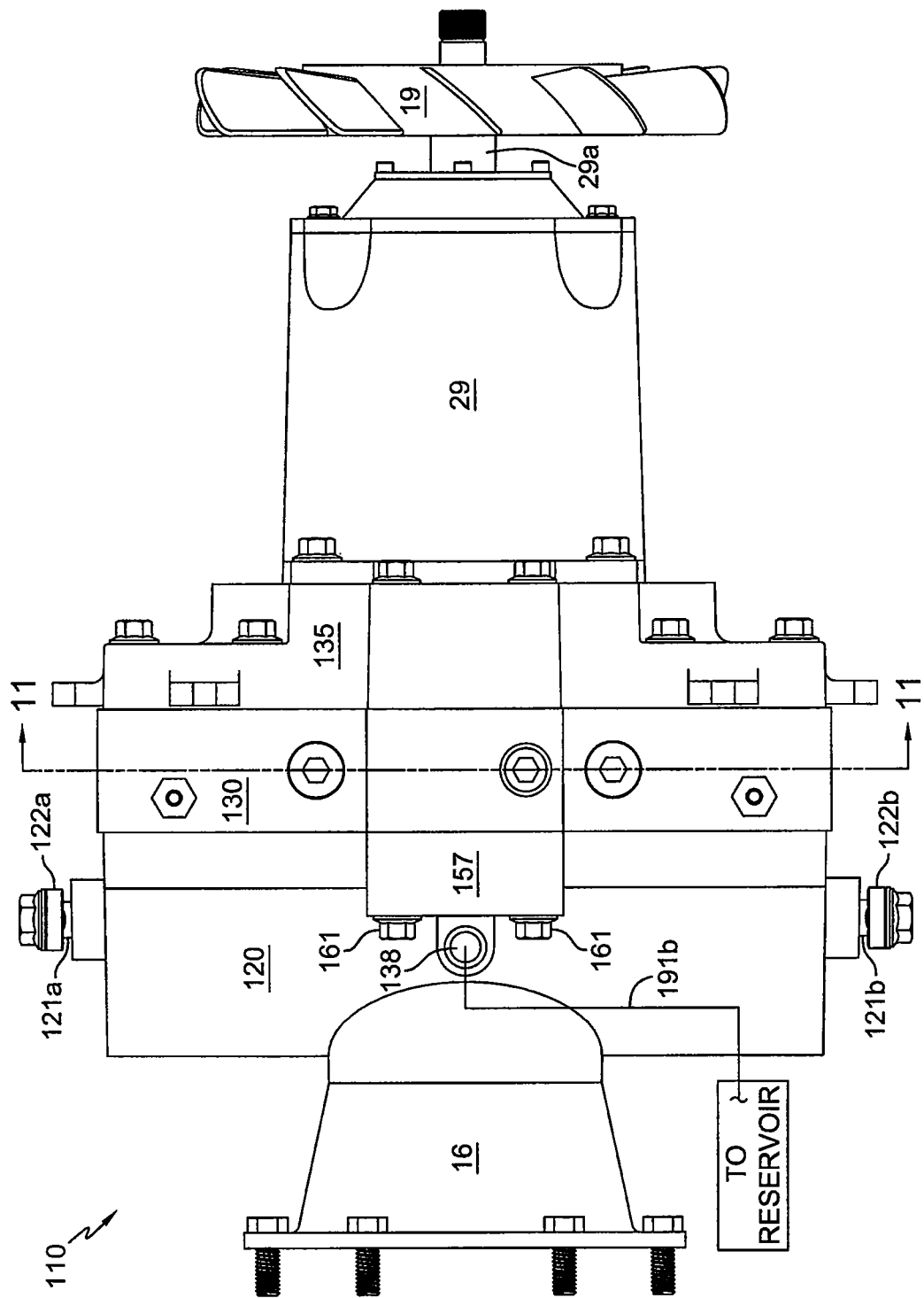
FIG. 10 is a top view of the dual pump and auxiliary pump design shown in FIG. 9.
Figure 11:
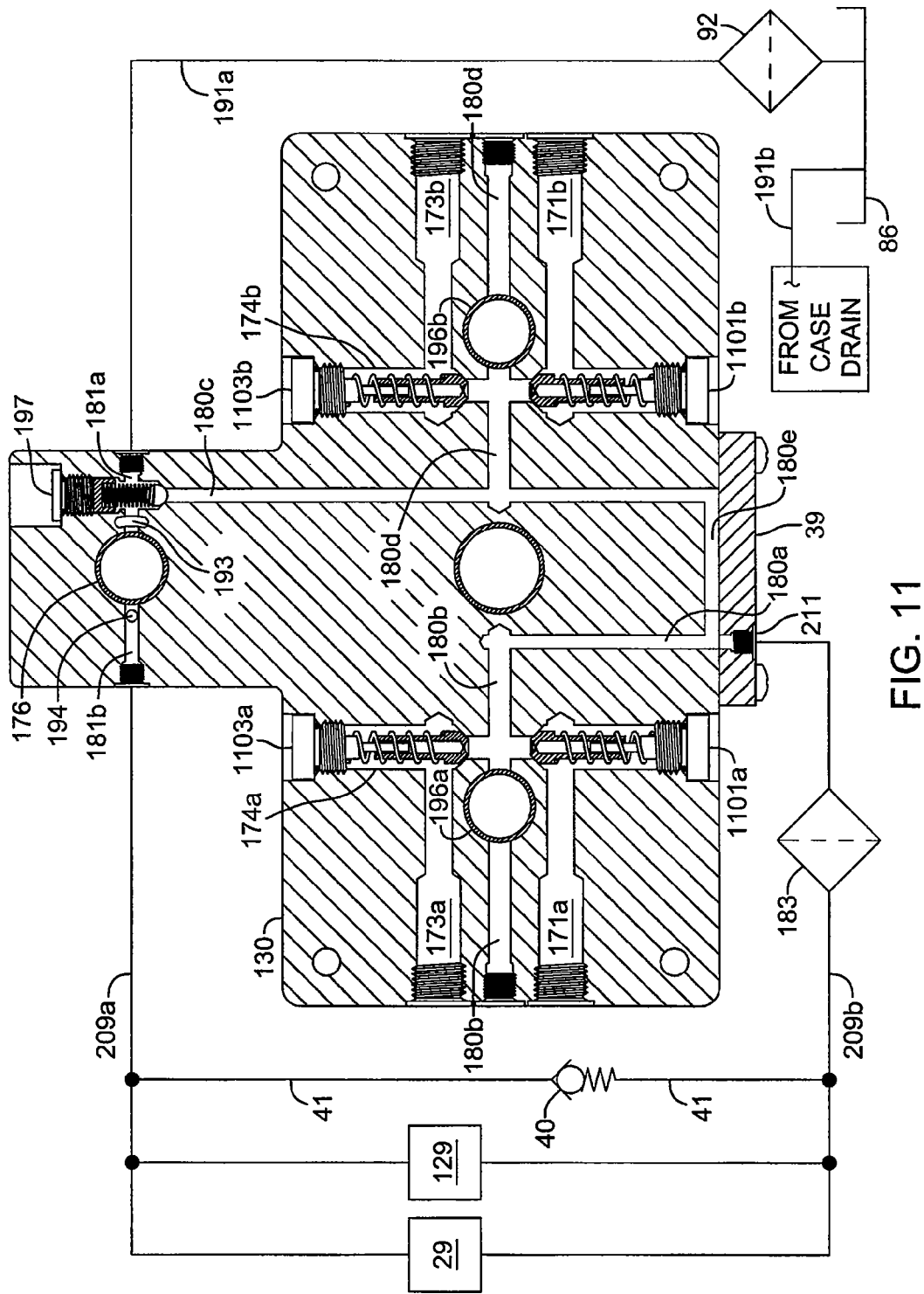
FIG. 11 is a cross sectional view of the end cap for the embodiment shown in FIG. 10, along lines 11-11, with certain system elements shown schematically.

A second embodiment of the present invention is shown in FIGS. 9-11. In this embodiment of pump apparatus 110, an auxiliary pump 157 has been provided in place of charge pumps 57a and 57b and auxiliary pump 157 may provide pressure for PTO 29. As shown in FIGS. 9 and 10, auxiliary pump 157 may be positioned above main drive shaft 124 and input shafts 125, 126 and attached to housing 120 by fasteners 161. The orientation of swash plates 48*a* and 48*b* and the location of trunnion arms 121*a* and 121*b*, control arms 122*a* and 122*b* and output system ports 171*a*, 171*b*, 173*a* and 173*b* can remain generally the same as in the previous embodiment, as exemplified in FIG. 11. As shown in FIG. 9, main drive shaft 124 may be drivingly engaged to pump shafts 125, 126 and auxiliary pump shaft 127. For driving auxiliary pump shaft 127, main drive shaft 124 may be coupled to gear 152*c*, which transfers the driving force from main input shaft 124 to gear 127*b*, then to gear 127*a* and then to auxiliary pump shaft 127. It should also be obvious to those with skill in the art that auxiliary pump 157 may also be positioned below gear 152*c*, approximately equidistant from the shafts 125 and 126 or may be positioned above or below shaft 125 or 126. However, the position shown is advantageous as it allows shafts 125 and 126 to be sized for the load of the pumps they drive and only shaft 124 carries the torque for more than one pump.

As shown in FIG. 10, trunnion arms 121*a* and 121*b* extend from opposite ends of housing 120. The addition of auxiliary pump 157 requires a different end cap 130. FIG. 11 shows a cross-section of end cap 130, taken along the lines 11-11 in FIG. 10. In this embodiment, system ports 173*a* and 171*a* correspond to pump 51*a*, and ports 171*b* and 173*b* correspond to pump 51*b*.

The charge and auxiliary pump configuration of this embodiment is different from that of pump apparatus 10, which does not include an auxiliary pump. Fluid is drawn from reservoir 86 through filter 92 into charge inlet line 191*a*, which is connected to charge inlet passage 181*a*. Passage 181*a* is a portion of passage 181 that is formed through end cap 130 and then separated into charge inlet passage 181*a* and charge outlet passage 181*b* by the insertion of bearing 176.

As is known in the industry, fluid is then drawn from charge inlet passage 181*a* through charge inlet kidney 193 by auxiliary pump 157, which then provides pressurized fluid through outlet passage 194 into auxiliary outlet 181*b*. Auxiliary pump 157 may be a gerotor type pump or similar pump. From auxiliary outlet 181*b* pressurized fluid travels through auxiliary line 209*a* to PTO 29 or to another hydraulic auxiliary device 129, which may be a deck lift for deck 89, hydraulic actuators for moving swash plates 48*a* and 48*b*, or other hydraulically operated devices. Fluid may return from auxiliary device 129 or PTO 29 by way of auxiliary return line 209*b*. The returned fluid passes through filter 183 and re-enters end cap 130 through auxiliary return inlet port 211 formed in auxiliary cap 39.

Properly sized auxiliary pump 157 will provide more fluid than is necessary to operate auxiliary device 129. To allow the excess fluid to escape the auxiliary circuit, an auxiliary relief valve 40 is provided in auxiliary relief line 41 that is connected between outlet 181*b* of auxiliary pump 157 and auxiliary return inlet port 211. A person of skill in the art will understand that the location of auxiliary relief valve 40 shown is exemplary, as valve 40 may be located in a variety of locations, including passages formed internal to end cap 130. Filter 183 may similarly by located in a variety of locations, including internal to end cap 130, and in some configurations, filter 183 may not be required.

After entry through auxiliary return inlet 211, the fluid then enters a charge fluid gallery comprising gallery 180*e*, two passages 180*a* and 180*c* extending into end cap 130, and passages 180*b* and 180*d* formed at right angles to passages 180*a* and 180*c*. Passages 180*b* and 180*d* are machined or formed in end cap 130 and each is then divided into two portions by bearings 196*a* and 196*b*, respectively, and the openings to passages 180*b* and 180*d* at the surface of end cap 130 are plugged. Gallery 180*e* is preferably formed on a side of end cap 130 and closed off by auxiliary cap 39.

Pumps 51*a* and 51*b* may not require all the fluid available and a charge relief valve 197 is provided to limit the pressure in passages 180*a*, 180*b*, 180*c*, 180*d* and 180*e*. As shown, this relieved fluid returns to inlet 181*a* of auxiliary pump 157. However, for additional cooling the relieved fluid may be returned to reservoir 86.

As shown in FIGS. 10 and 11, any fluid that escapes into the internal sump of housing 120 is returned to reservoir 86 through case drain 138 and case drain line 191*b*.

System ports 173*a* and 173*b* are also formed at a generally right angle to intersect with check plug ports 174*a* and 174*b*, respectively, for ease of manufacture. This design permits the insertion of check plugs 101*a*, 1101*b* and 1103*a*, 1103*b* into end cap 130 in the manner shown. This arrangement keeps check plugs 1101*a*, 1101*b* and 1103*a*, 1103*b* away from the fluid flow between pumps 51*a* and 51*b* and system ports 171*a* and 173*a*, and 171*b* and 173*b*, respectively. Being positioned between pumps 51*a* and 51*b* and system ports 171 and 173 would tend to reduce efficiency of pump apparatus 110. Having all of the required elements located in the same plane also decreases the required thickness of end cap 130.

This arrangement permits pump apparatus 110 to be mounted on vehicle frame 88 so that the axes of pumps 51*a* and 51*b* are parallel to the longitudinal axis of the vehicle. This design permits main drive shaft 124 to be directly driven by engine 84. This design eliminates the need for a separate belt and pulley, which decreases costs and increases the efficiency of the unit. Reservoir 86 may be secured to pump apparatus 110 or to vehicle frame 88 by a variety of known fastening mechanisms.

In this design, control arms 122*a* and 122*b* are mounted on the sides of housing 120 with respect to vehicle frame 88, which may increase the ease of connection with the various linkage mechanisms 69, depending on the structure of vehicle 12. As shown in FIG. 1, this arrangement also simplifies the connection of hydraulic hoses 70 and 72 from system ports 171*a*, 171*b*, 173*a* and 173*b* to motors 90.

Figure 12:
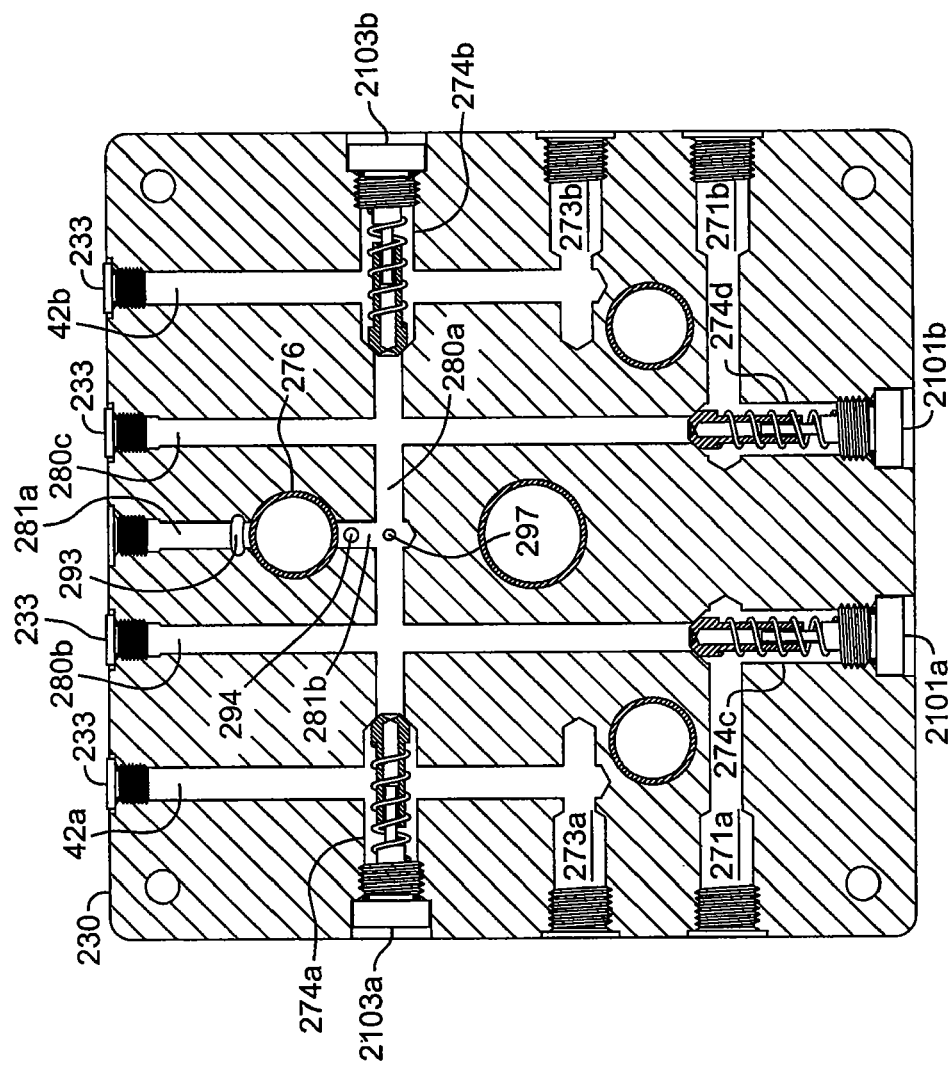
FIG. 12 is a cross-sectional view of an alternative end cap design for the embodiment shown in FIG. 11.
Figure 13:
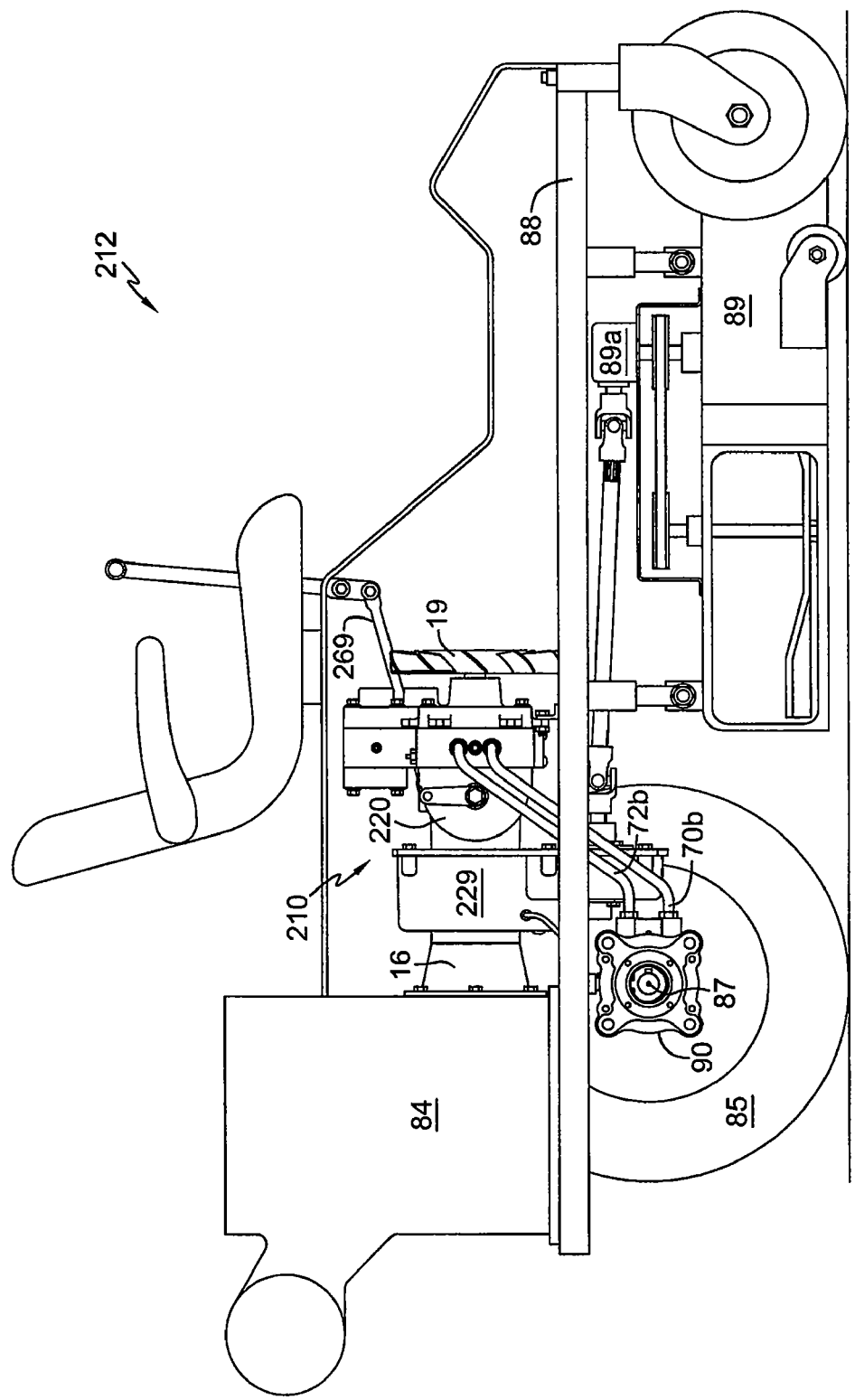
FIG. 13 depicts a vehicle employing a third embodiment of the drive assembly of the present invention with one wheel removed for clarity.
Figure 14:
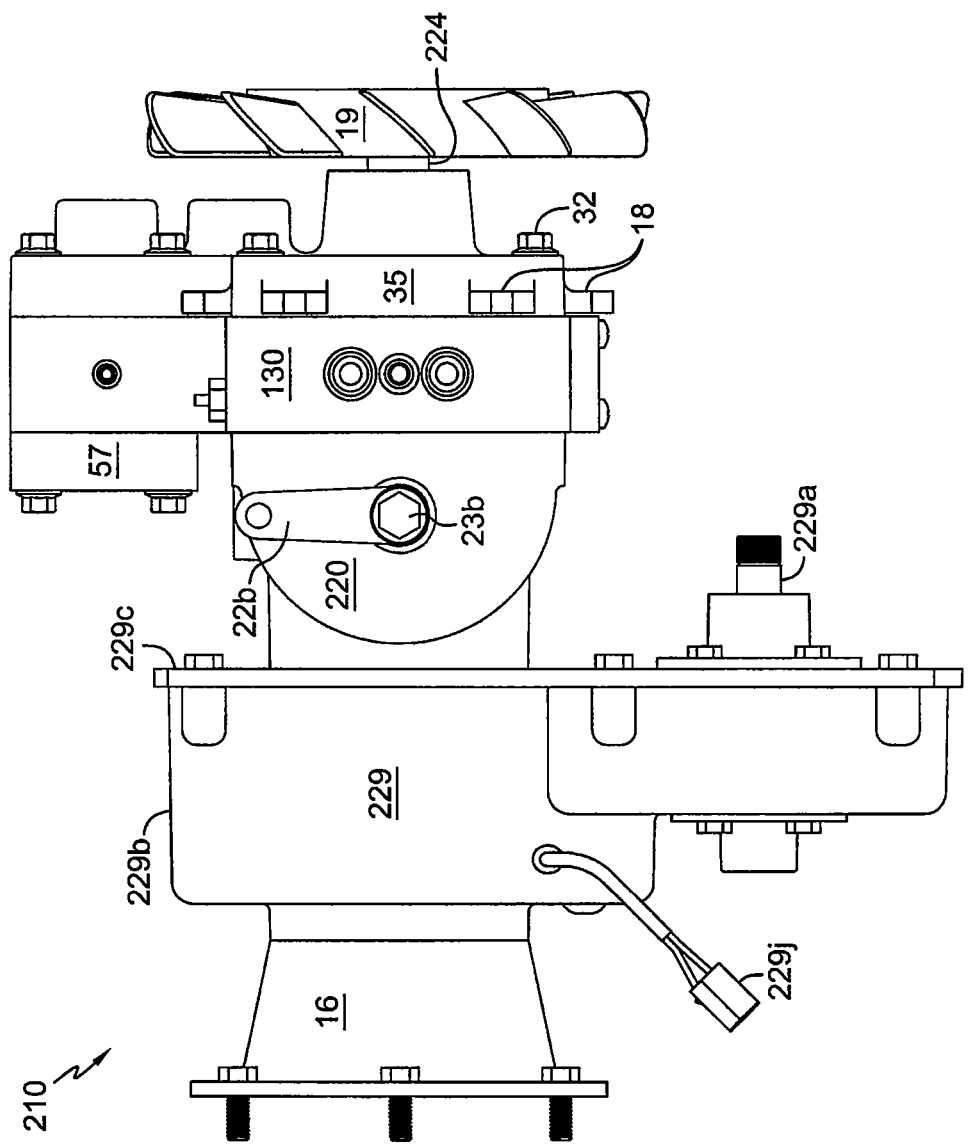
FIG. 14 is a side view of the embodiment of the invention shown in FIG. 13.
Figure 15:
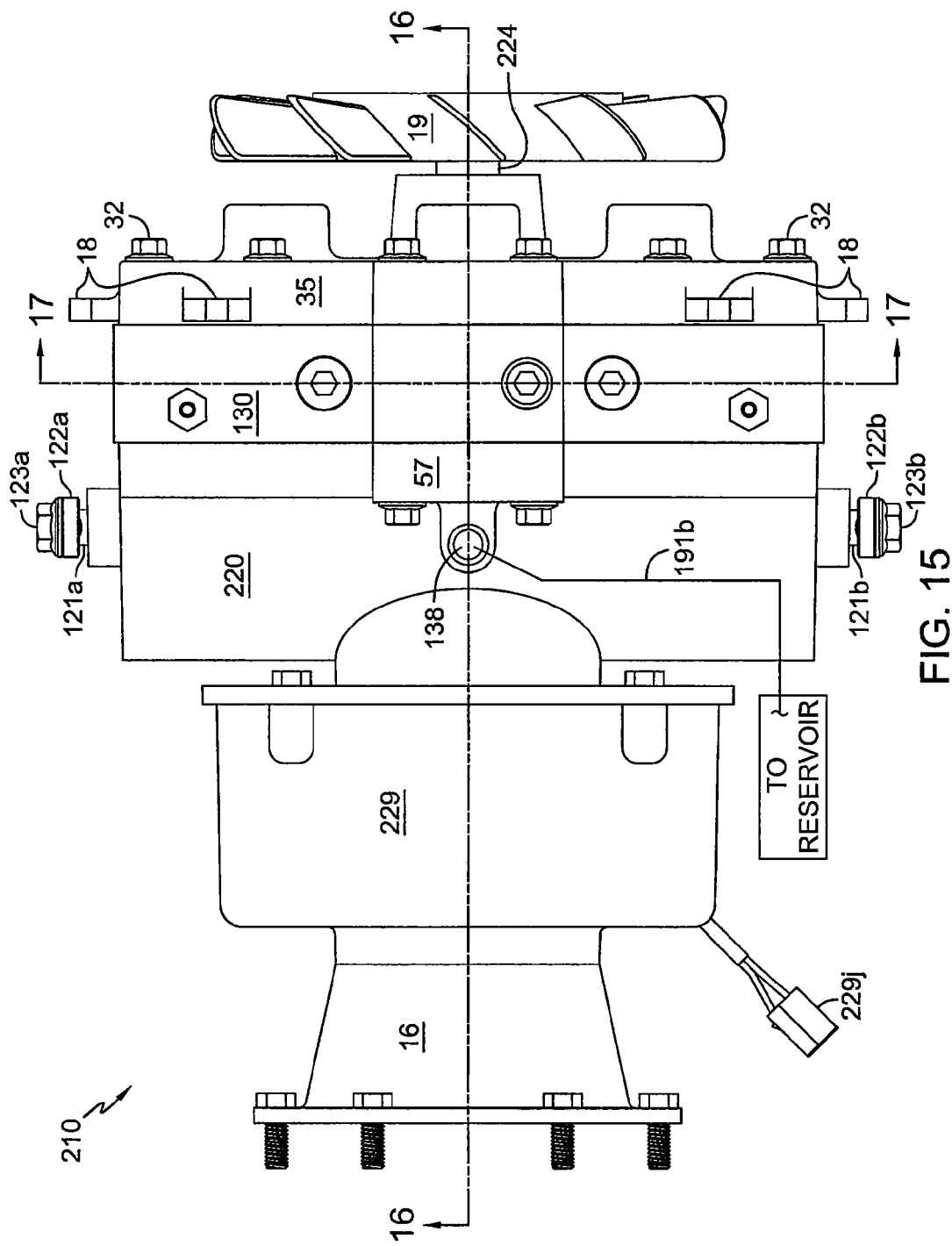
FIG. 15 is a top view of the embodiment of the invention shown in FIG. 13.
Figure 16:
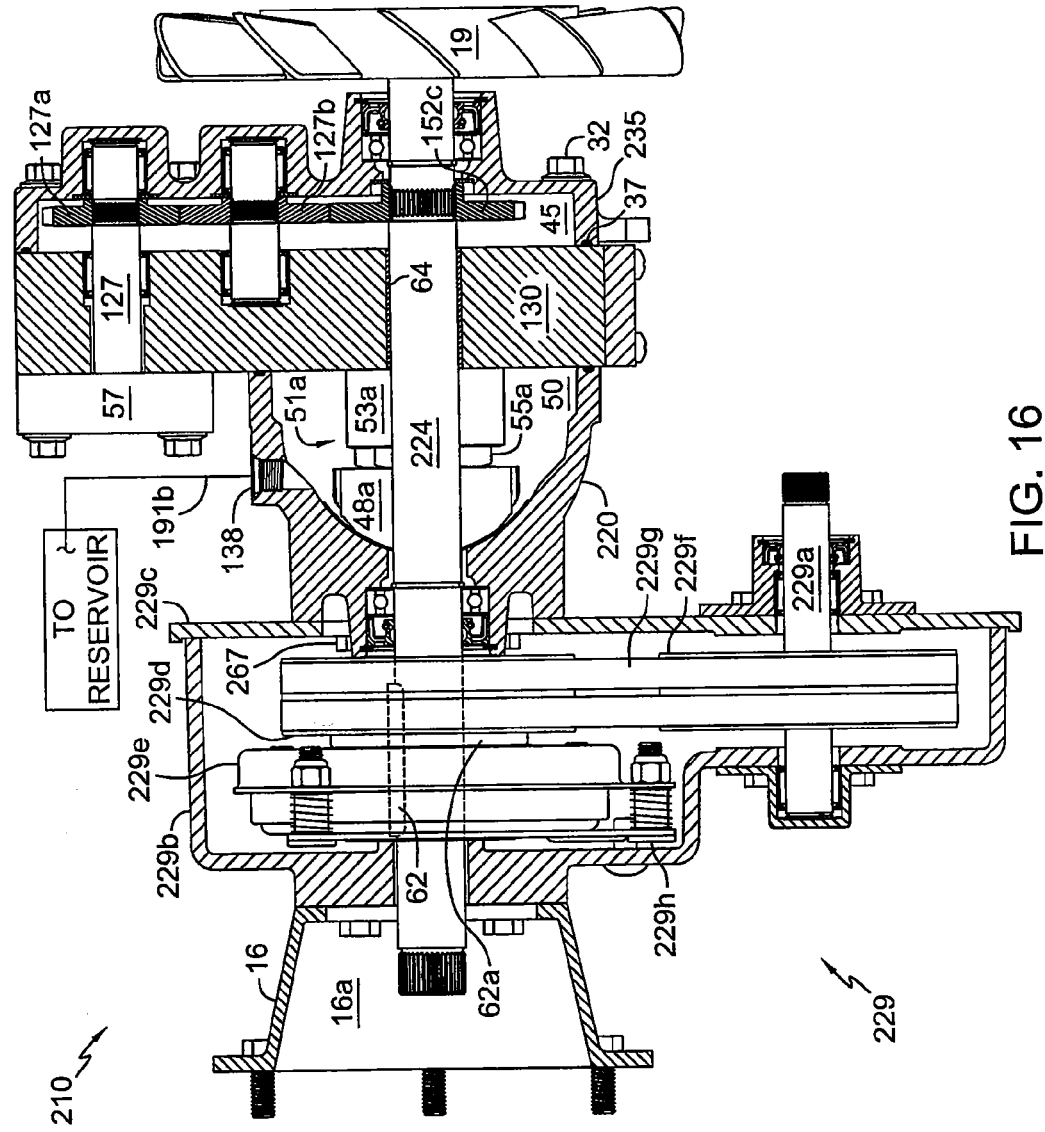
FIG. 16 is a cross-sectional view of the internal components of the dual pump arrangement shown in FIG. 15 along the lines 16-16 in FIG. 15, with certain parts shown as solid.
Figure 17:
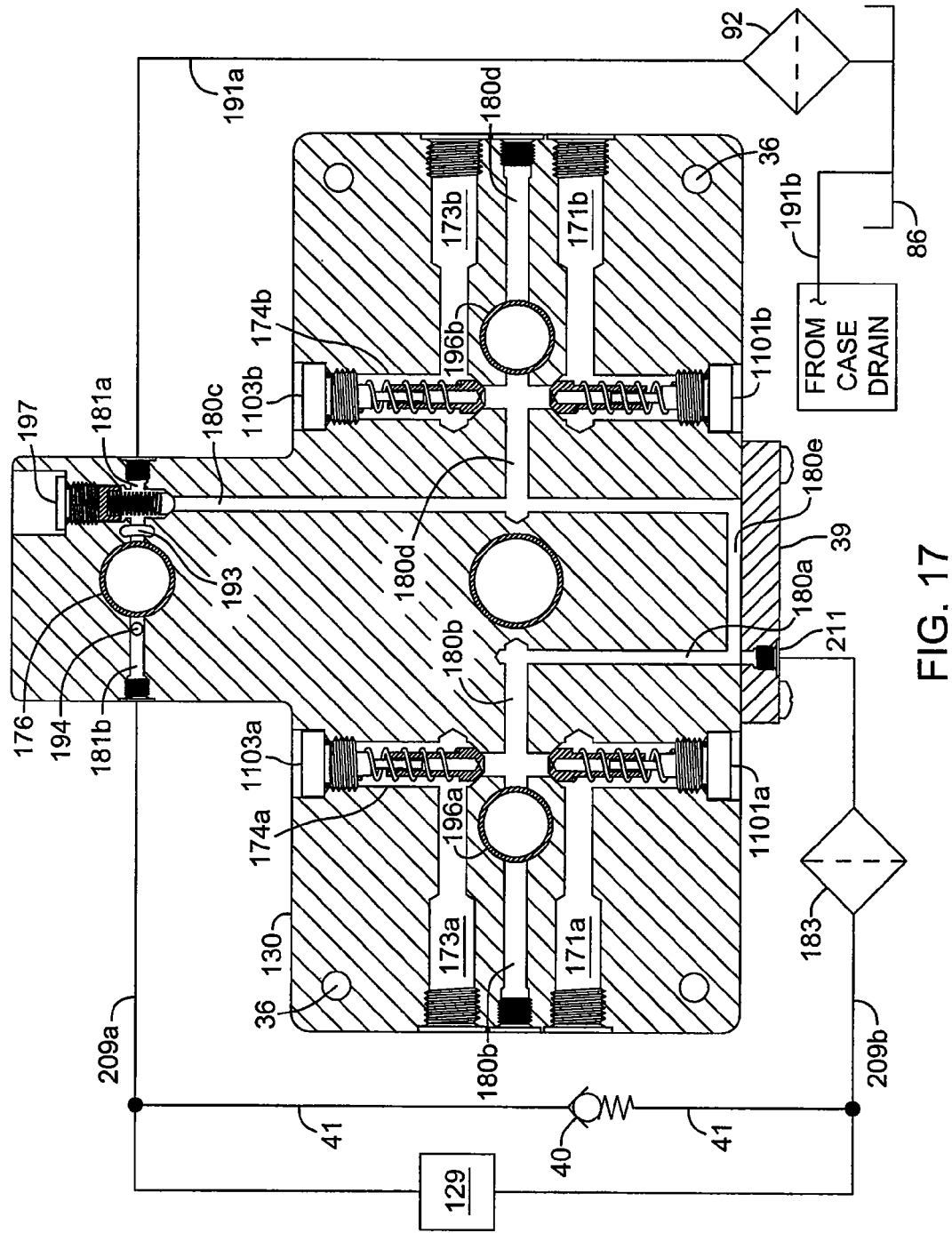
FIG. 17 is a cross-sectional view of the end cap shown in FIG. 16, along the lines 17-17 in FIG. 16.
Figure 18:
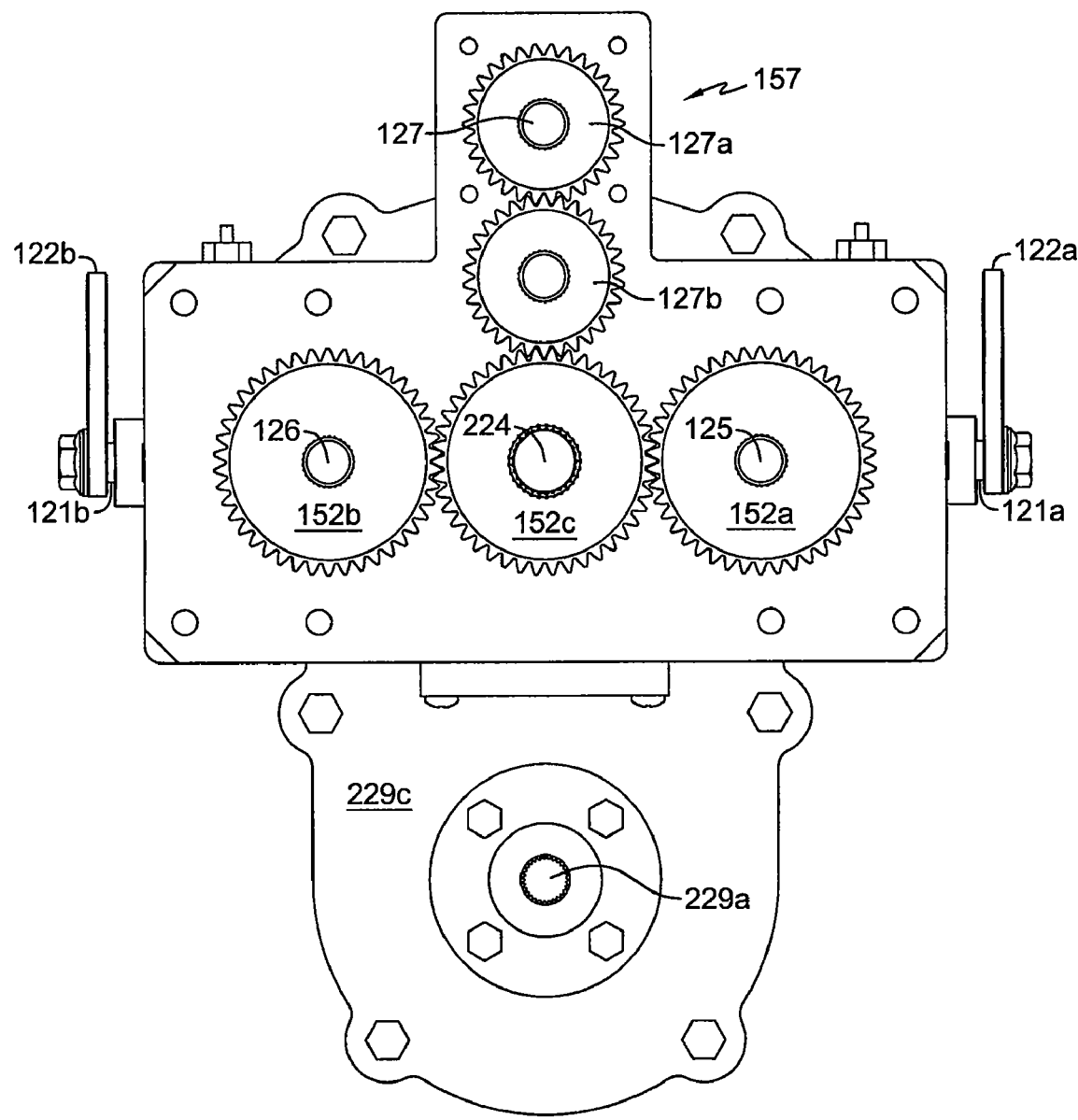
FIG. 18 is an end view of the third embodiment of this invention with the gear chamber cover and fan removed.
Figure 19:
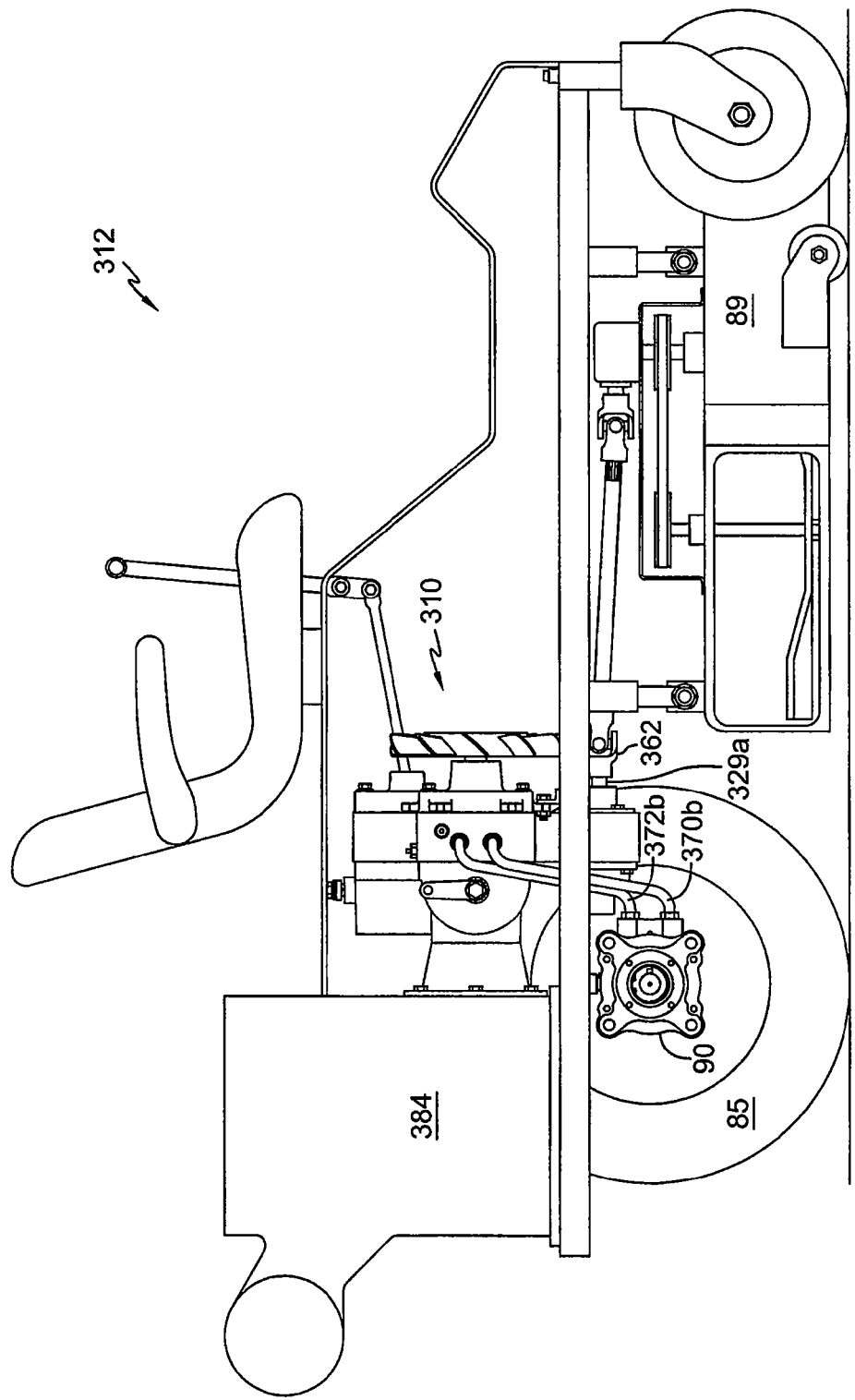
FIG. 19 depicts a vehicle employing a fourth embodiment of the drive assembly of the present invention with one wheel removed for clarity.
Figure 20:
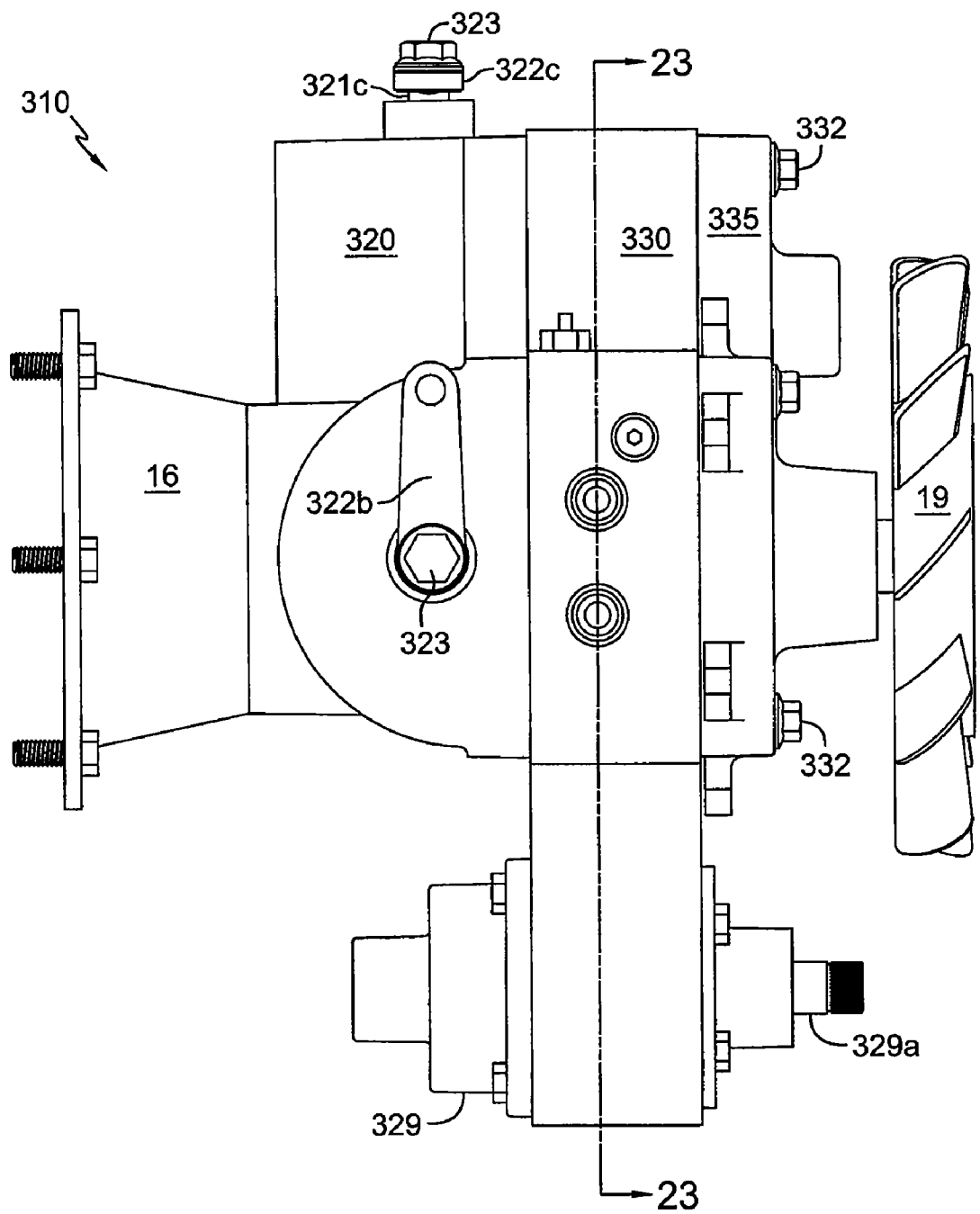
FIG. 20 is a side view of the fourth embodiment of this invention.

FIG. 12 shows a cross-section of another embodiment of this invention, where end cap 230 is similar in many ways to end cap 130 of FIG. 11. In this embodiment, a single charge pump (not shown) provides fluid to pumps 51*a* and 51*b*. System ports 271*a* and 273*a* correspond to pump 51*a*, and ports 271*b* and 273*b* correspond to pump 51*b*. The orientation of swash plates 48*a*, 48*b* and the location of trunnion arms 21*a* and 21*b*, control arms 22*a* and 22*b* and output system ports 271*a*, 271*b*, 273*a* and 273*b* would remain similar to that of the first two embodiments.

Fluid enters the charge pump from reservoir 86 through charge inlet 281*a*. From inlet 281*a* fluid passes through kidney-shaped opening 293 into the charge pump. The charge pump forces fluid through passage 294 into passage 281*b*, which is also the entry into charge gallery 280. Passages 281*a* and 281*b* are formed in a single operation and then separated by the insertion of bearing 276 into its bore. For convenience the opening to charge relief 297 is located in passage 281*b*, though it may be located at any position where it may communicate with charge gallery 280. Charge gallery 280 is formed by passage 280*a* extending between check plug 2103*a* positioned in port 274*a* and check plug 2103*b* positioned in port 274*b*, and passages 280*b* and 280*c* are formed at right angles to passage 280*a* and parallel with check plug 2101*a* positioned in port 274*c* and check plug 2101*b* positioned in port 274*d*. Passages 280*b* and 280*c* are then closed by plugs 233. Check plug 2103a is connected to system port 273a by connecting passage 42a. Similarly, check plug 2103b is connected to system port 273b by connecting passage 42b. Connecting passages 42a and 42b are closed at the edge of end cap 230 by plugs 233.

A third embodiment of the present invention is shown in FIGS. 13-18. Similar to the second embodiment of the present invention described above, this embodiment of pump apparatus 210 includes a main drive shaft 224 drivingly engaged to pump shafts 125, 126 and auxiliary pump shaft 127, which in turn drive pumps 51a and 51b and auxiliary pump 157, which may also be referred to as the first, second and third pumps or drive units respectively. The gearing connecting shafts 125, 126 and 127 (shown in FIG. 18) and the porting provided in end cap 130 (shown in FIG. 17) are also nearly identical to the gearing and porting described in connection with the second embodiment and shown in FIGS. 9 and 11, and are thus similarly numbered. For powering a mower deck 89 or other auxiliary device a PTO assembly or PTO unit 229 may be positioned between bell housing 16 and pump housing 20. This embodiment is distinguishable from the pump apparatus described in the second embodiment and shown in FIG. 10, which discloses a PTO 29 that extends from end cap 130 and that includes an output shaft that is coaxial with the main drive shaft.

More specifically, PTO assembly 229 defines an enclosed space, which is formed by the combination of first member 229b and plate 229c. Assembly 229 is attached to housing 220 by fasteners 267. PTO assembly 229 contains a first pulley 229d that is selectively coupled to main drive shaft 224 by an electric clutch 229e acting as a power takeoff mechanism. Moreover, electric clutch 229e is selectively coupled to main drive shaft 224 by key 62. Electric clutch 229e is actuated by signals sent on electrical connector 229j. These signals may be generated by one of a variety of methods—for example, by operator actuation of a switch (not shown) mounted in vehicle 212. Once actuated, clutch 229e acts to selectively couple first pulley 229d to main input shaft 224 by means of a hub 62a. Other elements are likely to be included within power take off assembly 229, such as mounting and adjusting elements 229h. PTO 229 also includes an output shaft 229a, which may be drivingly coupled to mower deck input 89a for powering mower deck 89 and which may be positioned below main drive shaft 224. For driving output shaft 229a, first pulley 229d may be drivingly coupled to a second pulley 229f by belt 229g. By positioning output shaft 229a below main drive shaft 224, output shaft 229a and input 89a to mower deck 89 are displaced in a substantially collinear relationship. It should be understood that this arrangement provides for a more efficient transfer of power from output shaft 229a to mower deck input 89a and mower deck 89. Additionally, this arrangement keeps the components associated with deck drive in a location that provides room for other components, such as linkages and other drive line elements. It should be appreciated by those with skill in the art that electric clutches are common in the industry and that other variations of clutches may also be used to couple first pulley 229d to main drive shaft 224.

A fourth embodiment of the present invention is shown in FIGS. 19-24. In this embodiment of pump apparatus 310, a hydraulic motor 329 has been positioned below main drive shaft 324. Motor 329, which may be a piston motor, a gerotor, a geroller or other design, drives output shaft 329a, which acts as a power take off shaft. Since this embodiment allows u-joint 362 and output shaft 329a to be positioned in a substantially collinear relationship to one another, the location of motor 329 below main drive shaft 324 simplifies the arrangement of output shaft 329a with respect to mower deck 89 and provides for a more efficient transfer of power from motor 329 to mower deck 89. Although motor 329 is depicted as being positioned below the main drive shaft 324, motor 329 may also be positioned in other locations as need dictates.

Pump chamber 350 is formed in housing 320 between end cap 330 and gear chamber cover 335. A plurality of rotatable pumps, including a first rotatable pump 351a, a second rotatable pump 351b (not shown), and an auxiliary pump 351c are mounted in pump chamber 350. The two primary rotatable pumps 351a and 351b operate the same as pumps 51a and 51b, described above, to provide output for the vehicle. Auxiliary pump 351c preferably operates in a similar manner, but as will be described below, the output of auxiliary pump 351c is used to power motor 329. End cap 330 may be secured to housing 320 by fasteners 332, which also secure gear chamber cover 335 to end cap 330.

Trunnion arms 321a and 321b are located and operate similarly to trunnion arms 21a and 21b described above. Although trunnion arm 321c also operates in a similar manner, it extends from the top of housing 320, and control arm 322c is mounted to trunnion arm 321c with fastener 323. The combination of trunnion arm 321c and control arm 322c operate to control auxiliary pump 351c.

Figure 22:
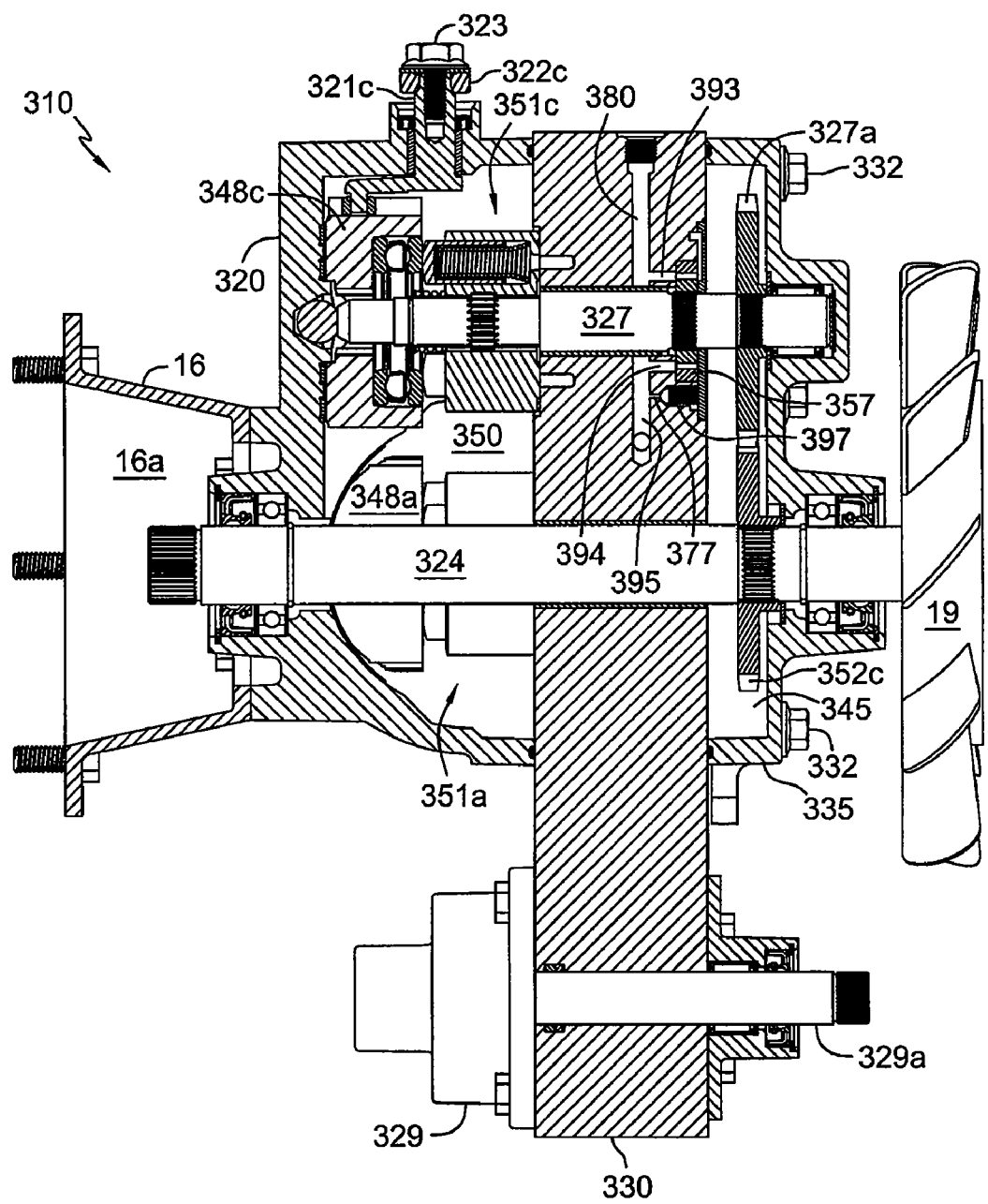
FIG. 22 is a cross-sectional view of the internal components of the dual pump arrangement shown in FIG. 21 along the lines 22-22 in FIG. 21, with certain parts shown as solid.

As exemplified in FIG. 22 and similar to pumps 51a and 51b described above, pumps 351a and 351b may be horizontally positioned on each side of main drive shaft 324 which defines a plane of symmetry between the pumps 351a and 351b and driven by pump shafts 325 and 326 (not shown), which are drivingly connected to main drive shaft 324 via a plurality of gear sets. Although the second pump 351b is not shown in these figures, it should be appreciated by those with skill in the art that it is mounted on the pump mounting surface of end cap 330 in the same manner as pump 51b is mounted on end cap 30, which is shown in FIG. 6. For driving auxiliary pump 351c, driving force may be transferred from main drive shaft 324 and gear 352c to gear 327a, where gear 327a is also drivingly coupled to auxiliary shaft 327. Gears 352c and 327a are preferably helical spur gears and mounted in gear chamber 345 and act as a second driving mechanism comprising a second gear train. Gear chamber 345 and pump chamber 350 operate and are formed similarly to gear chamber 45 and pump chamber 50 described above.

Figure 23:
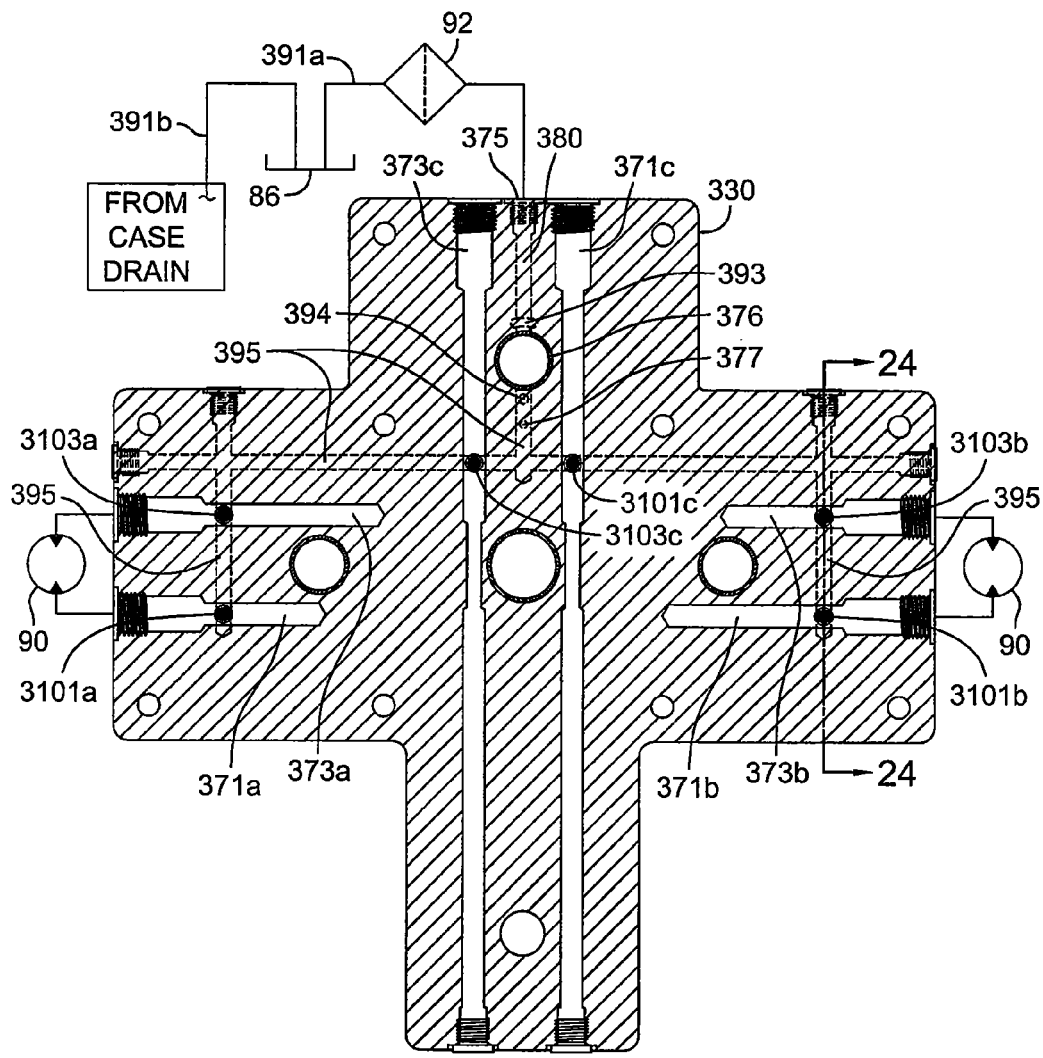
FIG. 23 is a cross-sectional view of the end cap of the fourth embodiment, along the lines 23-23 in FIG. 20, with certain system elements shown schematically.
Figure 24:
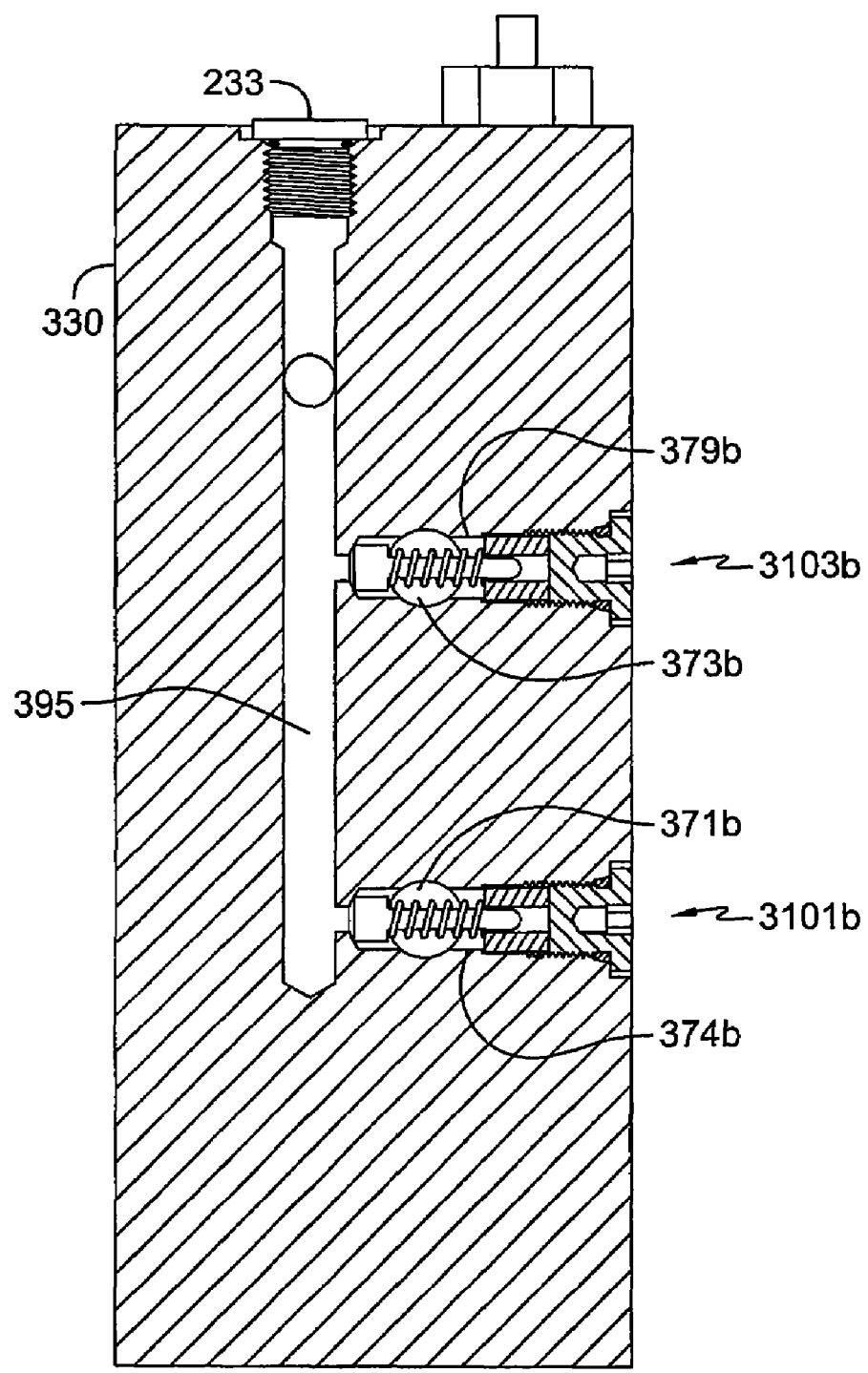
FIG. 24 is a cross-sectional view of the end cap shown in FIG. 23 along the lines 24-24 in FIG. 23.
Figure 25:
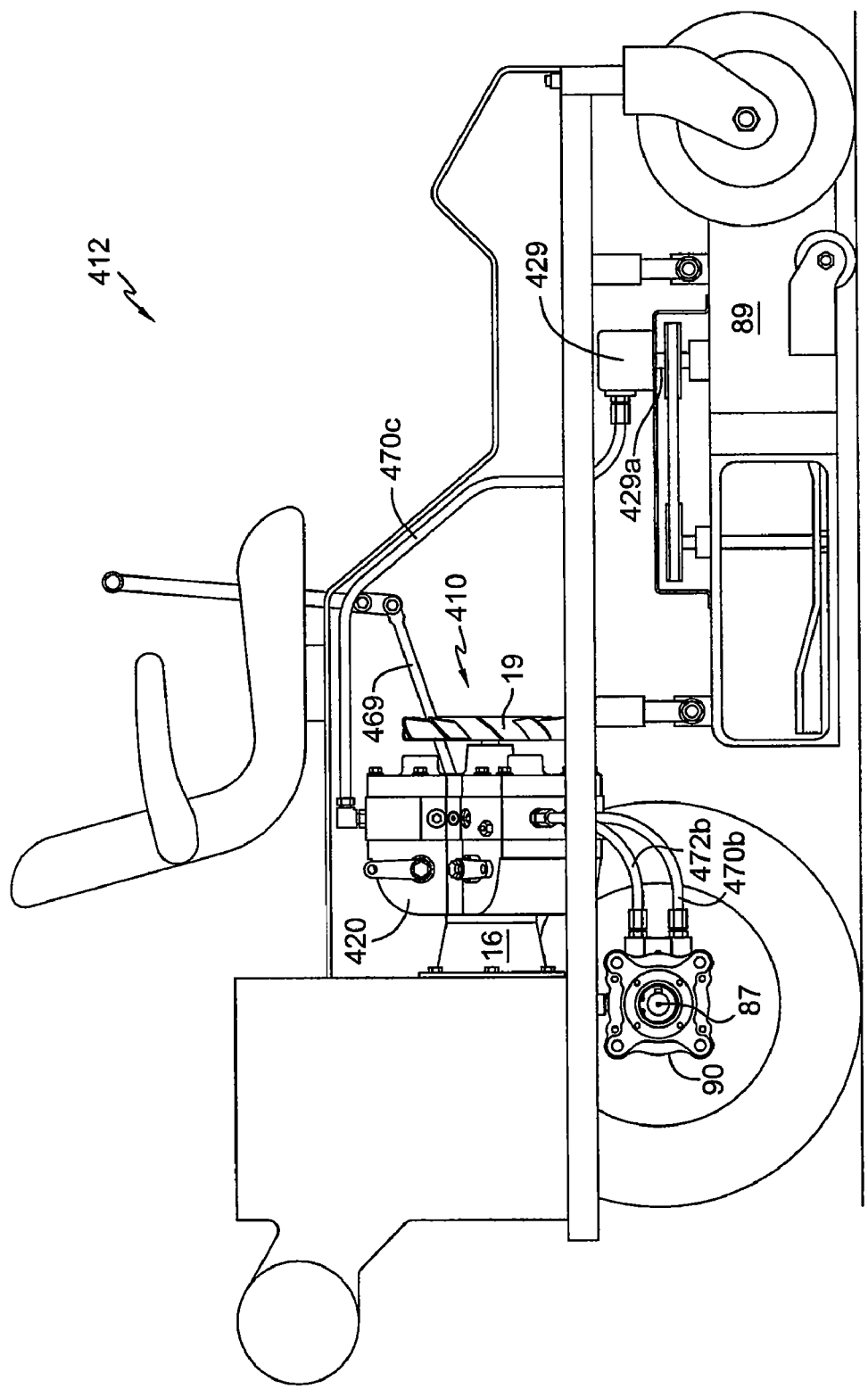
FIG. 25 is a vehicle employing a fifth embodiment of the drive assembly with one wheel removed for clarity.

As shown most clearly in FIG. 22 and similar to the embodiment depicted in FIG. 6, charge pump 357, which is a gerotor style charge pump, may be mounted in end cap 330 and splined to auxiliary shaft 327. Kidney 393 provides oil from passage 380 to charge pump 357. As shown in FIGS. 22 and 23, pressurized oil is sent from charge pump 357 to charge gallery 395 through passage 394. Charge relief opening 377 is also formed in charge gallery 395 to permit oil to be discharged therethrough by means of charge relief valve 397 in the event of excess oil pressure. Charge pump 357 supplies charge fluid to all three rotatable pumps 351a, b (not shown) and c, as shown in FIGS. 23 and 24.

For transferring driving force from main drive shaft 324 to output shaft 329a, end cap 330 includes hydraulic porting that connects auxiliary pump 351c to motor 329. As depicted in FIG. 23, which is a cross-sectional view of end cap 330 taken along lines 23-23 of FIG. 20, system ports 371 and 373 extend into end cap 330, with ports 371a and 373a in communication with first pump 351a, ports 371b and 373b in communication with second pump 351b, and ports 371c and 373c in communication with auxiliary pump 351c. A set of check valves 3101a-c and 3103a-c may be threaded into respective openings 374a-c and 379a-c in end cap 330, corresponding to ports 371a-c and 373a-c. As shown in FIG. 24, check valves 3101*a-c* and 3103*a-c* may be positioned substantially perpendicularly to the respective system ports 371*a-c* and 373*a-c*. Check valves 3101*a* and 3103*a* are in communication with pump 351*a*, check valves 3101*b* and 3103*b* are in communication with pump 351*b*, and check valves 3101*c* and 3103*c* are in communication with auxiliary pump 351*c*.

The pressure associated with each set of system ports 371*a*, 373*a*, 371*b*, 373*b*, 371*c* and 373*c* will be controlled by the positioning of the respective swash plate 348*a*, 348*b* (not shown) or 348*c* and operate in the same manner as ports 71*a*, 73*a* and swash plates 48*a* and 48*b* described above. The ends of each system ports 371*a*, 371*b*, 373*a*, and 373*b* are threaded to permit connection of hoses 370 and 372 and the like. Although system ports 371*c* and 373*c* are also threaded to permit connection of hoses and the like, system ports 371*c* and 373*c* extend into end cap 330 to hydraulically transfer driving force from auxiliary pump 351*c* to motor 329 and output shaft 329*a*, as shown in FIG. 23.

Figure 21:
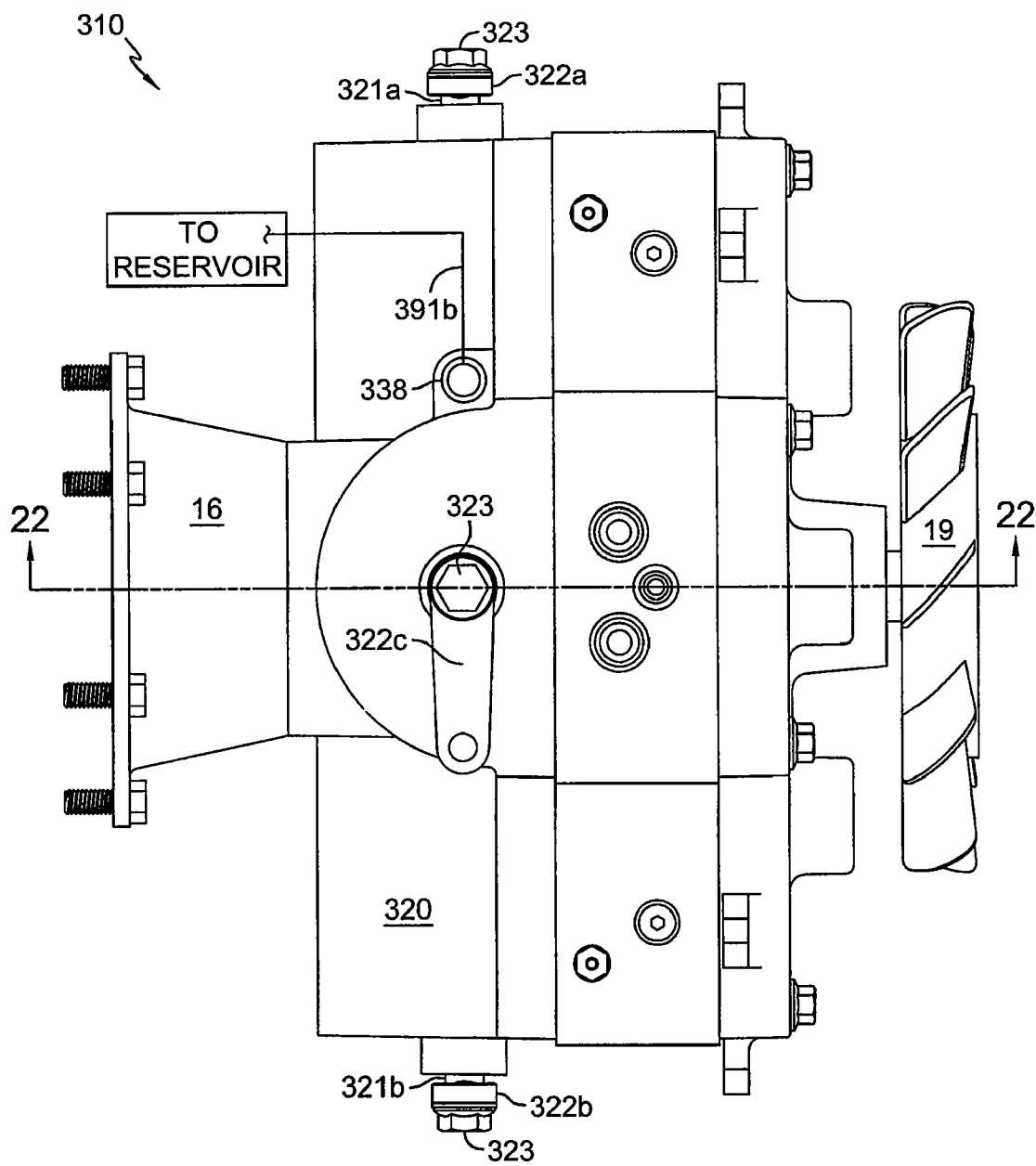
FIG. 21 is a top view of the fourth embodiment of this invention.

As exemplified in FIG. 23, an external oil reservoir 86 may be mounted at various locations on vehicle 312 or on pump apparatus 310. Oil may drain from pump chamber 350 through case drain 338, and then through outlet hose 391*b* to reservoir 86. Oil returns to the system through inlet hose 391*a*, passing through filter 92 into charge pump inlet 375. As shown in FIG. 21, case drain 338 is located in housing 320 in a location corresponding to pump chamber 350, so that oil will drain from chamber 350 to reservoir 86 and will be passed through filter 92 before its return to the system. Filter 92 could also be located on hose 391*b*. Referring to FIG. 23, passage 380 is formed in end cap 330 and connected to charge inlet 375. The operation of charge pump 357 to supply charge fluid to system ports 371*a*, 371*b*, 371*c*, 373*a*, 373*b* and 373*c* allows for a compact end cap 330.

Main drive shaft 324, pump shafts 325 and 326 (not shown), and auxiliary pump shaft 327 will operate and be supported in similar manners as main drive shaft 24 and pump shafts 25, 26, which are described in detail above, including using bearing 376 to support auxiliary shaft 327 and divide passage 380 into two separate sides. As with other embodiments of the present invention that are described herein, a cooling fan 19 may be secured to main drive shaft 324.

A fifth further embodiment of the present invention is shown in FIGS. 25-30. In this embodiment of pump apparatus 410, pump chamber 450, which is not shown but which would be similar to previously shown pump chambers, is formed in housing 420 and enclosed by end cap 430. A plurality of rotatable pumps, including a first rotatable pump 451*a*, a second rotatable pump 451*b*, and an auxiliary pump 451*c*, which are not shown but which would be similar to previously shown pumps, are mounted in pump chamber 450. The two primary rotatable pumps 451*a* and 451*b* operate the same as pumps 51*a* and 51*b*, described above, to provide output for the vehicle and drive wheel motors 90. Auxiliary pump 451*c* preferably operates in a similar manner, but as will be described below, the output of the auxiliary pump 451*c* is used to power motor 429. End cap 430 may be secured to housing 420 by fasteners 432, which also secure gear chamber cover 435 to end cap 430.

Trunnion arms 421*a*, 421*b* and 421*c* are not shown but would be similar to and operate similarly to trunnion arms 321*a*, 321*b* and 321*c* described above, and are positioned close to each of their respective pumps 451*a*, 451*b* and 451*c*. Control arms 422*a* (not shown), 422*b* and 422*c* are mounted to each respective trunnion arm 421*a*, 421*b* and 421*c* with fastener 423. The combination of trunnion arm 421*c* and control arm 422*c* operate to control auxiliary pump 451*c*.

Figure 26:
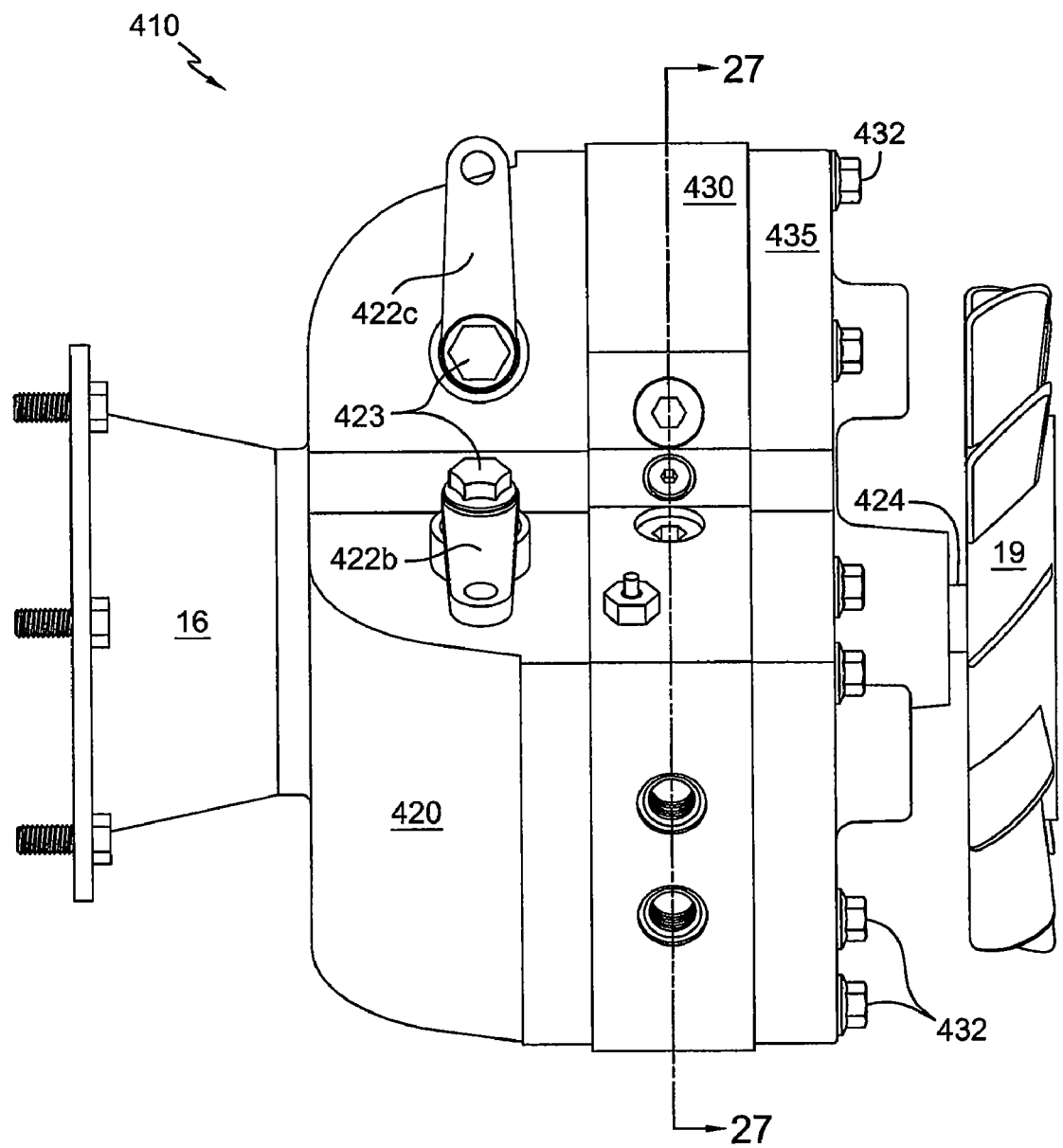
FIG. 26 is a side view of the fifth embodiment of this invention.
Figure 27:
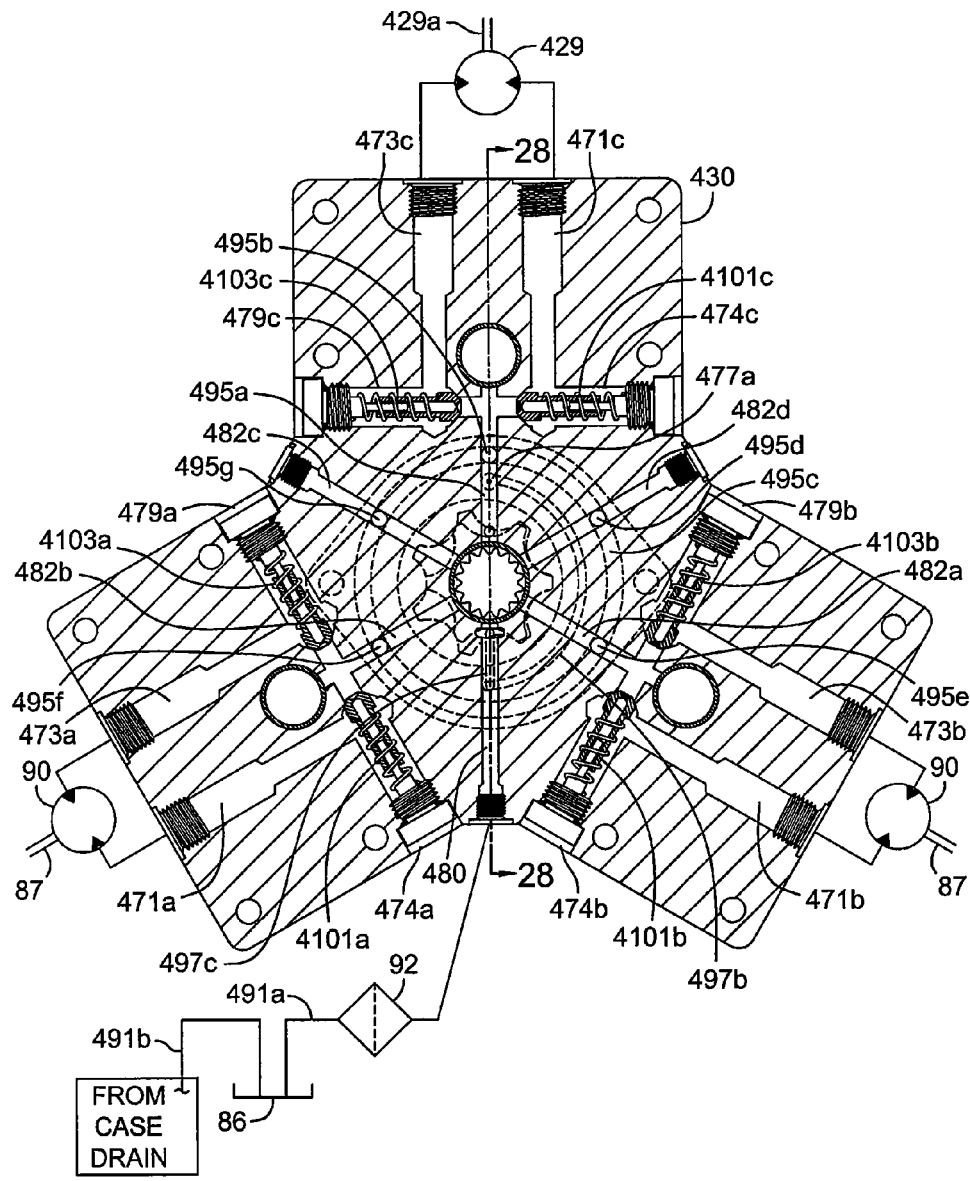
FIG. 27 is a cross-sectional view of the end cap of the fifth embodiment along the lines 27-27 in FIG. 26, with certain system elements shown schematically.

As exemplified in FIGS. 26 and 27, pumps 451*a*, 451*b* and 451*c* may be positioned around main drive shaft 424 and driven by pump shafts 425, 426 and 427, which are not shown, but which are similar to the shafts shown in the embodiment above and which are drivingly connected to main drive shaft 424 via a plurality of gear sets. Although it is not shown in these figures, it should be appreciated by those with skill in the art that pumps 451*a*, 451*b* and 451*c* are mounted on the pump mounting surface of end cap 430 in the same manner as pump 51*b* is mounted on end cap 30, which is shown in FIG. 6.

For driving auxiliary pump 451*c*, driving force may be transferred from main drive shaft 424 and gear 452*c* to gear 427*a*, where gear 427*a* is also drivingly coupled to auxiliary shaft 427. Gears 452*c* and 427*a* are not shown but are preferably helical spur gears similar to previously shown gears 352*c* and 327*a* and mounted in gear chamber 445. Gear chamber 445 and pump chamber 450 operate and are formed similarly to gear chamber 45 and pump chamber 50 described above. For directly powering mower deck 89, a hydraulic motor 429 has been positioned proximate to mower deck 89 and hydraulically connected to auxiliary pump 451*c* via high pressure hoses 470*c* and 472*c* (not shown), which will be described in more detail below. Motor 429 drives output shaft 429*a* and output shaft 429*a* may act as a power take off shaft and drive mower deck 89. Motor 429 may be a piston motor, a gerotor, a geroller or other design.

Figure 28:
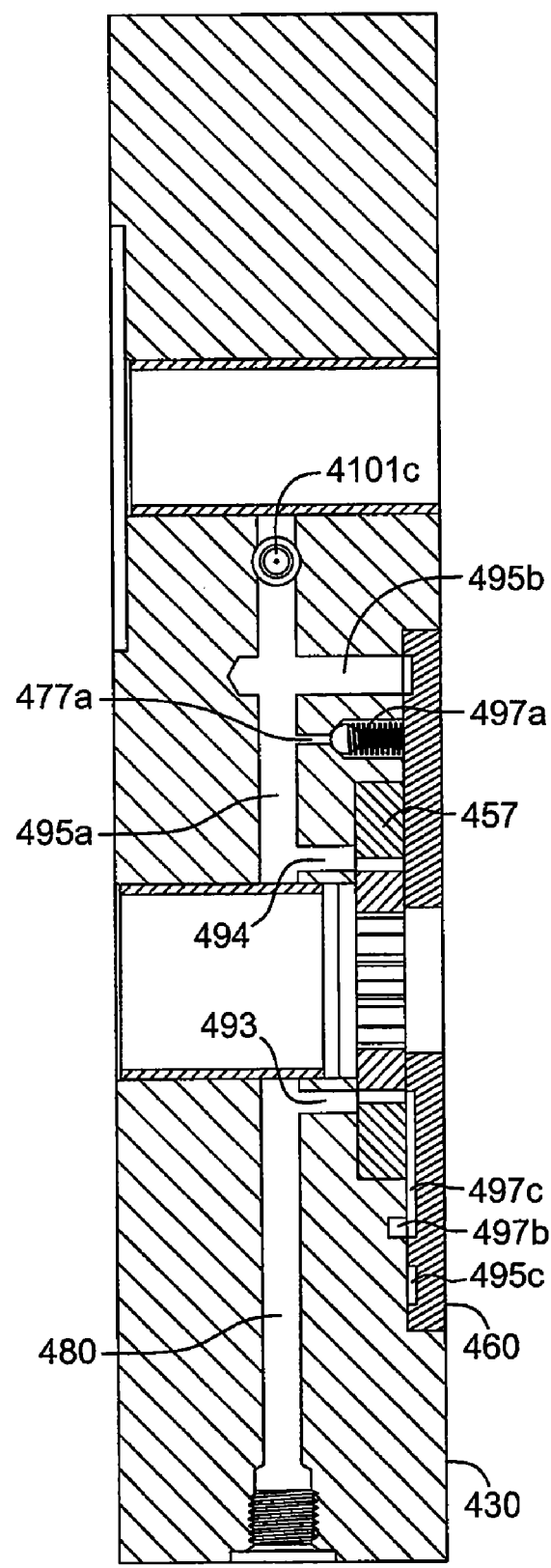
FIG. 28 is a cross-sectional view of the end cap shown in FIG. 27 along the lines 28-28 in FIG. 27.

As shown most clearly in FIG. 28 and similar to the embodiment depicted in FIG. 22, charge pump 457, which is a gerotor style charge pump, may be mounted in end cap 430 and splined to main drive shaft 424. Kidney 493 provides oil from passage 480 to charge pump 457. As shown in FIGS. 27-30, pressurized oil is then sent from charge pump 457 to charge gallery 495 through passage 494. Charge pump 457 supplies charge fluid to all three rotatable pumps 451*a*, 451*b* and 451*c* through charge gallery 495 by supplying charge fluid from passage 494 to passage 495*a* and then through passage 495*b* to annular groove 495*c* formed in charge cover 460. Charge gallery 495 is also fluidly connected to each of pumps 451*a* and 451*b* via passages 495*e* and 495*f* and ports 482*a* and 482*b*, respectively. Charge gallery 495 may also provide charge fluid to auxiliary devices via ports 482*c* and 482*d*, which are connected to charge gallery 495*c* by charge passages 495*g* and 495*d*, respectively. Charge relief opening 477*a* is also formed in passage 495*a* to permit oil to be discharged therethrough by means of charge relief valve 497*a* in the event of excess oil pressure. The fluid that is discharged through charge relief valve 497*a* enters into charge relief passage 497*b* and is sent to charge relief outlet 497*c* formed in charge cover 460, which is in fluid connection with charge pump 457 and allows the fluid to re-enter the fluid system for the pump apparatus 410 therethrough. Note that annular groove 495*c* may also be formed in end cap 430 and charge relief passage 497*b* may be formed in charge cover 460.

For transferring driving force from main drive shaft 424 to output shaft 429*a*, auxiliary pump 451*c* and motor 429 are connected by high pressure hoses 470*c* and 472*c*. Further, hoses 470*c* and 472*c* are fluidly connected to system ports 471*c* and 473*c* on one end and at the other end directly to motor 429. As depicted in FIG. 27, which is a cross-sectional view of end cap 430 taken along lines 26-26 of FIG. 26, system ports 471 and 473 extend into end cap 430, with ports 471*a* and 473*a* being in communication with first pump 451*a*, ports 471*b* and 473*b* being in communication with second pump 451*b*, and ports 471*c* and 473*c* being in communication with auxiliary pump 451*c*. A set of check valves 4101*a-c* and 4103*a-c* may be threaded into respective openings 474*a-c* and 479a-c in end cap 430, corresponding to ports 471a-c and 473a-c. As shown in FIG. 27, check valves 4101a-c and 4103a-c may be positioned substantially coplanar, yet perpendicular to the respective system ports 471a-c and 473a-c. Check valves 4101a and 4103a are in communication with pump 451a, check valves 4101b and 4103b are in communication with pump 451b, and check valves 4101c and 4103c are in communication with auxiliary pump 451c.

As with the previous embodiments and as exemplified by FIG. 27, charge pump 457 draws hydraulic fluid from reservoir 86, which may be located either on vehicle 412 or on pump apparatus 410, and then through charge inlet line 491a and filter 92. Fluid from a case drain returns to reservoir 86 through a case drain line 491b.

While specific embodiments of the invention have been described in detail, it will be appreciated by those skilled in the art that various modifications and alternatives to those details could be developed in light of the overall teachings of the disclosure. Accordingly, the particular arrangement disclosed is meant to be illustrative only and not limiting as to the scope of the invention which is to be given the full breadth of the appended claims and any equivalents thereof.

What is claimed is:

1. A drive apparatus for a vehicle, comprising:
   a main drive shaft;
   a power takeoff mechanism driven by the main drive shaft and comprising a power takeoff output shaft laterally offset from the main drive shaft;
   a first drive unit having a first input shaft and a second drive unit having a second input shaft symmetrically disposed about a plane containing the main drive shaft and the power takeoff output shaft, wherein the power takeoff output shaft, first input shaft and second input shaft are each disposed parallel to the main drive shaft; and
   a gear train connecting the main drive shaft to the first input shaft and the second input shaft.

2. The drive apparatus of claim 1, further comprising a power takeoff drive connecting the main drive shaft to the power takeoff output shaft.

3. The drive apparatus of claim 2, further comprising a housing covering the gear train and the power takeoff drive.

4. The drive apparatus of claim 2, wherein each drive unit further comprises a hydraulic pump, a separate hydraulic motor hydraulically connected to the hydraulic pump, and an axle shaft driven by the hydraulic motor.

5. The drive apparatus of claim 1, wherein the power takeoff mechanism comprises a power takeoff pump, a power takeoff motor driven by the power takeoff pump, and the power takeoff output shaft is driven by the power takeoff motor.

6. A drive apparatus comprising:
   a housing;
   a main input shaft at least partially disposed in the housing and driven by a prime mover;
   a first drive unit comprising a first drive unit input shaft extending generally parallel to the main input shaft and disposed at least partially within the housing and on one side of the main input shaft;
   a second drive unit comprising a second drive unit input shaft extending generally parallel to the main input shaft and disposed at least partially within the housing and on the opposite side of the main input shaft from the first drive unit input shaft;
   a first driving mechanism connecting the main input shaft to the first drive unit input shaft and the second drive unit input shaft;
   a power takeoff output shaft extending generally parallel to and offset from the main input shaft, the first drive unit input shaft and the second drive unit input shaft, the power takeoff output shaft being disposed approximately equidistant from the first and second drive unit input shafts; and
   a power takeoff mechanism operable to selectively provide drive from the main input shaft to the power takeoff output shaft.

7. The drive apparatus of claim 6, comprising a power takeoff input shaft extending generally parallel to the main input shaft and offset from the main input shaft on a side of the main input shaft that is generally opposite the power takeoff output shaft and approximately equidistant from the first and second drive unit input shafts.

8. The drive apparatus of claim 7, further comprising a second driving mechanism connecting the main input shaft to the power takeoff input shaft.

9. The drive apparatus of claim 8, further comprising a power takeoff hydraulic pump driven by the power takeoff input shaft, a power takeoff hydraulic motor driving the power takeoff output shaft and hydraulic porting extending from and hydraulically connecting the power takeoff hydraulic pump to the power takeoff hydraulic motor.

10. The drive apparatus of claim 9, wherein the first drive unit comprises a first hydraulic pump and the second drive unit comprises a second hydraulic pump and the first and second hydraulic pumps are mounted on a common support structure.

11. The drive apparatus of claim 10, wherein the power takeoff hydraulic pump is mounted on the common support structure.

12. The drive apparatus of claim 11, wherein the power takeoff hydraulic motor is mounted on the common support structure.

13. The drive apparatus of claim 8, wherein the first driving mechanism comprises a first gear train and the second driving mechanism comprises a second gear train.

14. The drive apparatus of claim 10, wherein the first drive unit comprises a first hydraulic motor and the second drive unit comprises a second hydraulic motor and the first hydraulic motor and the second hydraulic motor are located a distance from the portion of the drive apparatus containing the first hydraulic pump and the second hydraulic pump.

15. The drive apparatus of claim 10, comprising a charge pump, wherein the charge pump provides fluid to operate the power takeoff mechanism and provides charge fluid to the first hydraulic pump and the second hydraulic pump.

16. The drive apparatus of claim 15, wherein the charge pump is located on the common support structure.

17. The drive apparatus of claim 10, further comprising a first operating lever movable to adjust the displacement of the first hydraulic pump and a second operating lever movable to adjust the displacement of the second hydraulic pump, wherein the first operating lever and the second operating lever are positioned on opposite sides of the drive apparatus.

18. The drive apparatus of claim 10, wherein the first hydraulic pump and the second hydraulic pump are located on one side of the common support structure and the first driving mechanism is located on another, opposite side of the common support structure.

19. The drive apparatus of claim 6, further comprising a fan driven by the power takeoff output shaft.

20. The drive apparatus of claim 6, wherein the power takeoff mechanism comprises an electrically operable clutch to selectively couple the main input shaft to the power takeoff output shaft.

21. A drive apparatus comprising:
- a gear casing forming a chamber;
- a main input shaft driven by a prime mover and extending into the chamber;
- a first pump assembly driven by a first pump shaft, and a second pump assembly driven by a second pump shaft, wherein the first pump shaft and the second pump shaft extend into the chamber and are laterally offset from the main input shaft, with the first pump shaft to one side of the main input shaft and the second pump shaft to a second, opposite side of the main input shaft;
- a power takeoff assembly comprising a power takeoff input shaft driven by the main input shaft, wherein the power takeoff input shaft extends into the chamber;
- a first plurality of gears located in the chamber and drivingly connecting the main input shaft to the first pump shaft and the second pump shaft and comprising an input shaft gear disposed on the main input shaft; and
- a second plurality of gears located in the chamber and drivingly connecting the main input shaft to the power takeoff input shaft, wherein the second plurality of gears comprises the input shaft gear and at least one power takeoff input gear positioned on the power takeoff input shaft, and the input shaft gear is the only common gear between the first plurality of gears and the second plurality of gears.

22. The drive apparatus of claim 21, wherein the power takeoff assembly drives a power takeoff shaft laterally offset from a plane extending through at least two of the axes of the main input shaft, the first pump shaft and the second pump shaft.

23. The drive apparatus of claim 21, wherein the power takeoff assembly drives a power takeoff shaft and wherein the power takeoff shaft is generally parallel to the first and second pump shafts and offset from a plane that extends through the axes of rotation of the first and second pump shafts along a line that extends perpendicular from said plane and through the main input shaft.

24. The drive apparatus of claim 21, further comprising a power takeoff shaft driven by the power takeoff assembly, wherein a portion of the power takeoff assembly is located laterally of a line that extends through the main input shaft, the first pump shaft and the second pump shaft and another portion of the power takeoff assembly is located laterally of said line in a direction opposite the first portion.

25. A drive apparatus comprising:
- first and second hydraulic drive units, each of which drives a single axle, wherein the first hydraulic drive unit comprises a first hydraulic pump driven by a first pump shaft having a first axis of rotation and the second hydraulic drive unit comprises a second hydraulic pump driven by a second pump shaft having a second axis of rotation;
- a main input shaft located in the region between the first pump shaft and the second pump shaft and connected to and driven by a prime mover, wherein the main input shaft has a third axis of rotation;
- a power takeoff device selectively engageable to operate a driven mechanism, the power takeoff device having an power takeoff input shaft having a fourth axis of rotation,
- wherein the power takeoff shaft is displaced sideways from the first pump shaft, the second pump shaft and the main input shaft, and approximately equidistant from the first and second pump shafts;
- a gear casing attached to and extending across the drive apparatus to enclose a volume, wherein a least a portion of the first pump shaft, the second pump shaft, the main input shaft and the power takeoff input shaft extend into the volume;
- a first drive train disposed in the gear casing to drivingly connect the main input shaft to the first and second pump shafts; and
- a second drive train disposed in the gear casing to drivingly connect the main input shaft to the power takeoff input.

26. The drive apparatus of claim 25, wherein the first, second and third axes of rotation lie generally in a plane, and the fourth axis of rotation is offset from said plane and is approximately equidistant from the first and second axes.

* * * * *